(12) United States Patent
Kopelman et al.

(10) Patent No.: US 11,872,102 B2
(45) Date of Patent: Jan. 16, 2024

(54) UPDATING AN ORTHODONTIC TREATMENT PLAN DURING TREATMENT

(71) Applicant: Align Technology, Inc., San Jose, CA (US)

(72) Inventors: Avi Kopelman, Palo Alto, CA (US); Rene M. Sterental, Palo Alto, CA (US); Igor Kvasov, Santa Clara, CA (US); Mikhail Dyachenko, Moscow (RU); Roman A. Roschin, Moscow (RU); Leonid Vyacheslavovich Grechishnikov, Moscow (RU)

(73) Assignee: Align Technology, Inc., San Jose, CA (US)

(*) Notice: Subject to any disclaimer, the term of this patent is extended or adjusted under 35 U.S.C. 154(b) by 0 days.

(21) Appl. No.: 17/829,339

(22) Filed: May 31, 2022

(65) Prior Publication Data
US 2022/0296340 A1 Sep. 22, 2022

Related U.S. Application Data

(63) Continuation of application No. 17/003,857, filed on Aug. 26, 2020, now Pat. No. 11,382,720, which is a (Continued)

(51) Int. Cl.
*G06T 7/00* (2017.01)
*A61C 7/08* (2006.01)
(Continued)

(52) U.S. Cl.
CPC ............ *A61C 7/002* (2013.01); *G06T 7/0012* (2013.01); *A61C 7/08* (2013.01); *A61C 7/146* (2013.01);
(Continued)

(58) Field of Classification Search
CPC ... G06T 7/0012; G06T 7/0014; G06T 7/0016; G06T 2207/30036; G06V 10/10; G06V 10/20; G06V 10/751; G06V 10/761; G06V 2201/03; A61C 7/002; A61C 7/08; A61C 7/146
See application file for complete search history.

(56) References Cited

U.S. PATENT DOCUMENTS 5,975,893 A  11/1999  Chishti et al.
6,227,850 B1  5/2001  Chishti et al.
(Continued)

*Primary Examiner* — Andrew W Johns
(74) *Attorney, Agent, or Firm* — Lowenstein Sandler LLP

(57) ABSTRACT

A processing device receives image data of an actual condition of a patient's dental arch at a stage of an orthodontic treatment plan. The processing device compares the image data of the actual condition of the patient's dental arch to a planned condition of the patient's dental arch for the stage of the orthodontic treatment plan. The processing device determines an updated orthodontic treatment plan based on one or more differences between the actual condition of the patient's dental arch and the planned condition of the patient's dental arch determined from the comparing. The processing device generates one or more three-dimensional (3D) models for one or more new orthodontic aligners in accordance with the updated orthodontic treatment plan.

20 Claims, 12 Drawing Sheets

Related U.S. Application Data continuation of application No. 15/839,730, filed on Dec. 12, 2017, now Pat. No. 10,792,127.

(60) Provisional application No. 62/449,982, filed on Jan. 24, 2017.

(51) Int. Cl.
*A61C 7/00* (2006.01)
*A61C 7/14* (2006.01)
*A61C 9/00* (2006.01)

(52) U.S. Cl.
CPC .. *A61C 9/0053* (2013.01); *G06T 2207/30036* (2013.01)

(56) References Cited

U.S. PATENT DOCUMENTS

| | | | |
|---|---|---|---|
| 6,227,851 B1 | 5/2001 | Chishti et al. |
| 6,299,440 B1 | 10/2001 | Phan et al. |
| 6,318,994 B1 | 11/2001 | Chishti et al. |
| 6,371,761 B1 | 4/2002 | Cheang et al. |
| 6,386,878 B1 | 5/2002 | Pavlovskaia et al. |
| 6,406,292 B1 | 6/2002 | Chishti et al. |
| 6,409,504 B1 | 6/2002 | Jones et al. |
| 6,457,972 B1 | 10/2002 | Chishti et al. |
| 6,488,499 B1 | 12/2002 | Miller |
| 6,514,074 B1 | 2/2003 | Chishti et al. |
| 6,554,611 B2 | 4/2003 | Chishti et al. |
| 6,582,229 B1 | 6/2003 | Miller et al. |
| 6,602,070 B2 | 8/2003 | Miller et al. |
| 6,621,491 B1 | 9/2003 | Baumrind et al. |
| 6,688,886 B2 | 2/2004 | Hughes et al. |
| 6,726,478 B1 | 4/2004 | Isiderio et al. |
| 6,729,876 B2 | 5/2004 | Chishti et al. |
| 6,739,869 B1 | 5/2004 | Taub et al. |
| 6,767,208 B2 | 7/2004 | Kaza |
| 6,783,360 B2 | 8/2004 | Chishti |
| 7,040,896 B2 | 5/2006 | Pavlovskaia et al. |
| 7,063,532 B1 | 6/2006 | Jones et al. |
| 7,074,038 B1 | 7/2006 | Miller |
| 7,074,039 B2 | 7/2006 | Kopelman et al. |
| 7,077,647 B2 | 7/2006 | Choi et al. |
| 7,108,508 B2 | 9/2006 | Hedge et al. |
| 7,134,874 B2 | 11/2006 | Chishti et al. |
| 7,156,661 B2 | 1/2007 | Choi et al. |
| 7,160,107 B2 | 1/2007 | Kopelman et al. |
| 7,241,142 B2 | 7/2007 | Abolfathi et al. |
| 7,293,988 B2 | 11/2007 | Wen |
| 7,309,230 B2 | 12/2007 | Wen |
| 7,357,634 B2 | 4/2008 | Knopp |
| 7,555,403 B2 | 6/2009 | Kopelman et al. |
| 7,637,740 B2 | 12/2009 | Knopp |
| 7,689,398 B2 | 3/2010 | Cheng et al. |
| 7,736,147 B2 | 6/2010 | Kaza et al. |
| 7,746,339 B2 | 6/2010 | Matov et al. |
| 7,844,356 B2 | 11/2010 | Matov et al. |
| 7,844,429 B2 | 11/2010 | Matov et al. |
| 7,865,259 B2 | 1/2011 | Kuo et al. |
| 7,878,804 B2 | 2/2011 | Korytov et al. |
| 7,880,751 B2 | 2/2011 | Kuo et al. |
| 7,904,308 B2 | 3/2011 | Arnone et al. |
| 7,942,672 B2 | 5/2011 | Kuo |
| 7,970,627 B2 | 6/2011 | Kuo et al. |
| 7,970,628 B2 | 6/2011 | Kuo et al. |
| 8,038,444 B2 | 10/2011 | Kitching et al. |
| 8,044,954 B2 | 10/2011 | Kitching et al. |
| 8,075,306 B2 | 12/2011 | Kitching et al. |
| 8,092,215 B2 | 1/2012 | Stone-Collonge et al. |
| 8,099,268 B2 | 1/2012 | Kitching et al. |
| 8,108,189 B2 | 1/2012 | Chelnokov et al. |
| 8,126,726 B2 | 2/2012 | Matov et al. |
| 8,260,591 B2 | 9/2012 | Kass et al. |
| 8,275,180 B2 | 9/2012 | Kuo |
| 8,401,826 B2 | 3/2013 | Cheng et al. |
| 8,439,672 B2 | 5/2013 | Matov et al. |
| 8,562,338 B2 | 10/2013 | Kitching et al. |
| 8,788,285 B2 | 7/2014 | Kuo |
| 8,843,381 B2 | 9/2014 | Kuo et al. |
| 8,874,452 B2 | 10/2014 | Kuo |
| 8,896,592 B2 | 11/2014 | Boltunov et al. |
| 8,930,219 B2 | 1/2015 | Trosien et al. |
| 9,037,439 B2 | 5/2015 | Kuo et al. |
| 9,060,829 B2 | 6/2015 | Sterental et al. |
| 9,125,709 B2 | 9/2015 | Matty |
| 9,211,166 B2 | 12/2015 | Kuo et al. |
| 9,220,580 B2 | 12/2015 | Borovinskih et al. |
| 9,364,296 B2 | 6/2016 | Kuo |
| 9,375,300 B2 | 6/2016 | Matov et al. |
| 9,414,897 B2 | 8/2016 | Wu et al. |
| 9,492,245 B2 | 11/2016 | Sherwood et al. |
| 9,642,678 B2 | 5/2017 | Kuo |
| 10,248,883 B2 | 4/2019 | Borovinskih et al. |
| 10,342,638 B2 | 7/2019 | Kitching et al. |
| 10,463,452 B2 | 11/2019 | Matov et al. |
| 10,595,966 B2 | 3/2020 | Carrier, Jr. et al. |
| 10,617,489 B2 | 4/2020 | Grove et al. |
| 10,722,328 B2 | 7/2020 | Velazquez et al. |
| 10,758,322 B2 | 9/2020 | Pokotilov et al. |
| 10,779,718 B2 | 9/2020 | Meyer et al. |
| 10,792,127 B2 | 10/2020 | Kopelman et al. |
| 10,828,130 B2 | 11/2020 | Pokotilov et al. |
| 10,835,349 B2 | 11/2020 | Cramer et al. |
| 10,973,611 B2 | 4/2021 | Pokotilov et al. |
| 10,996,813 B2 | 5/2021 | Makarenkova et al. |
| 10,997,727 B2 | 5/2021 | Xue et al. |
| 11,020,205 B2 | 6/2021 | Li et al. |
| 11,020,206 B2 | 6/2021 | Shi et al. |
| 11,026,766 B2 | 6/2021 | Chekh et al. |
| 11,033,359 B2 | 6/2021 | Velazquez et al. |
| 11,071,608 B2 | 7/2021 | Derakhshan et al. |
| 11,096,763 B2 | 8/2021 | Akopov et al. |
| 11,116,605 B2 | 9/2021 | Nyukhtikov et al. |
| 11,151,753 B2 | 10/2021 | Gao et al. |
| 11,154,381 B2 | 10/2021 | Roschin et al. |
| 11,259,896 B2 | 3/2022 | Matov et al. |
| 11,357,598 B2 | 6/2022 | Cramer |
| 11,382,720 B2 * | 7/2022 | Kopelman et al. .... A61C 7/002 |
| 2003/0008259 A1 | 1/2003 | Kuo et al. |
| 2003/0143509 A1 | 7/2003 | Kopelman et al. |
| 2003/0207227 A1 | 11/2003 | Abolfathi |
| 2004/0137400 A1 | 7/2004 | Chishti et al. |
| 2004/0152036 A1 | 8/2004 | Abolfathi |
| 2004/0197728 A1 | 10/2004 | Abolfathi et al. |
| 2004/0259049 A1 | 12/2004 | Kopelman et al. |
| 2005/0182654 A1 | 8/2005 | Abolfathi et al. |
| 2005/0244791 A1 | 11/2005 | Davis et al. |
| 2006/0127836 A1 | 6/2006 | Wen |
| 2006/0127852 A1 | 6/2006 | Wen |
| 2006/0127854 A1 | 6/2006 | Wen |
| 2006/0275731 A1 | 12/2006 | Wen et al. |
| 2006/0275736 A1 | 12/2006 | Wen et al. |
| 2008/0306724 A1 | 12/2008 | Kitching et al. |
| 2010/0009308 A1 | 1/2010 | Wen et al. |
| 2010/0068672 A1 | 3/2010 | Arjomand et al. |
| 2010/0068676 A1 | 3/2010 | Mason et al. |
| 2010/0092907 A1 | 4/2010 | Knopp |
| 2010/0167243 A1 | 7/2010 | Spiridonov et al. |
| 2013/0204599 A1 | 8/2013 | Matov et al. |
| 2014/0335466 A1 * | 11/2014 | Kitching et al. ....... A61C 7/002 433/24 |
| 2016/0310235 A1 | 10/2016 | Derakhshan et al. |
| 2017/0273760 A1 | 9/2017 | John et al. |
| 2018/0280118 A1 | 10/2018 | Cramer |
| 2019/0029784 A1 | 1/2019 | Moalem et al. |
| 2019/0053876 A1 | 2/2019 | Sterental et al. |
| 2019/0192259 A1 | 6/2019 | Kopelman et al. |
| 2019/0328487 A1 | 10/2019 | Levin et al. |
| 2019/0328488 A1 | 10/2019 | Levin et al. |
| 2019/0333622 A1 | 10/2019 | Levin et al. |
| 2020/0000552 A1 | 1/2020 | Mednikov et al. |
| 2020/0000554 A1 | 1/2020 | Makarenkova et al. |
| 2020/0000555 A1 | 1/2020 | Yuryev et al. |
| 2020/0085546 A1 | 3/2020 | Li et al. |

(56) References Cited

U.S. PATENT DOCUMENTS

| | | |
|---|---|---|
| 2020/0107915 A1 | 4/2020 | Roschin et al. |
| 2020/0155274 A1 | 5/2020 | Pimenov et al. |
| 2020/0214800 A1 | 7/2020 | Matov et al. |
| 2020/0297458 A1 | 9/2020 | Roschin et al. |
| 2020/0306011 A1 | 10/2020 | Chekhonin et al. |
| 2020/0306012 A1 | 10/2020 | Roschin et al. |
| 2020/0360109 A1 | 11/2020 | Gao et al. |
| 2021/0073998 A1 | 3/2021 | Brown et al. |
| 2021/0134436 A1 | 5/2021 | Meyer et al. |
| 2021/0174477 A1 | 6/2021 | Shi et al. |

* cited by examiner

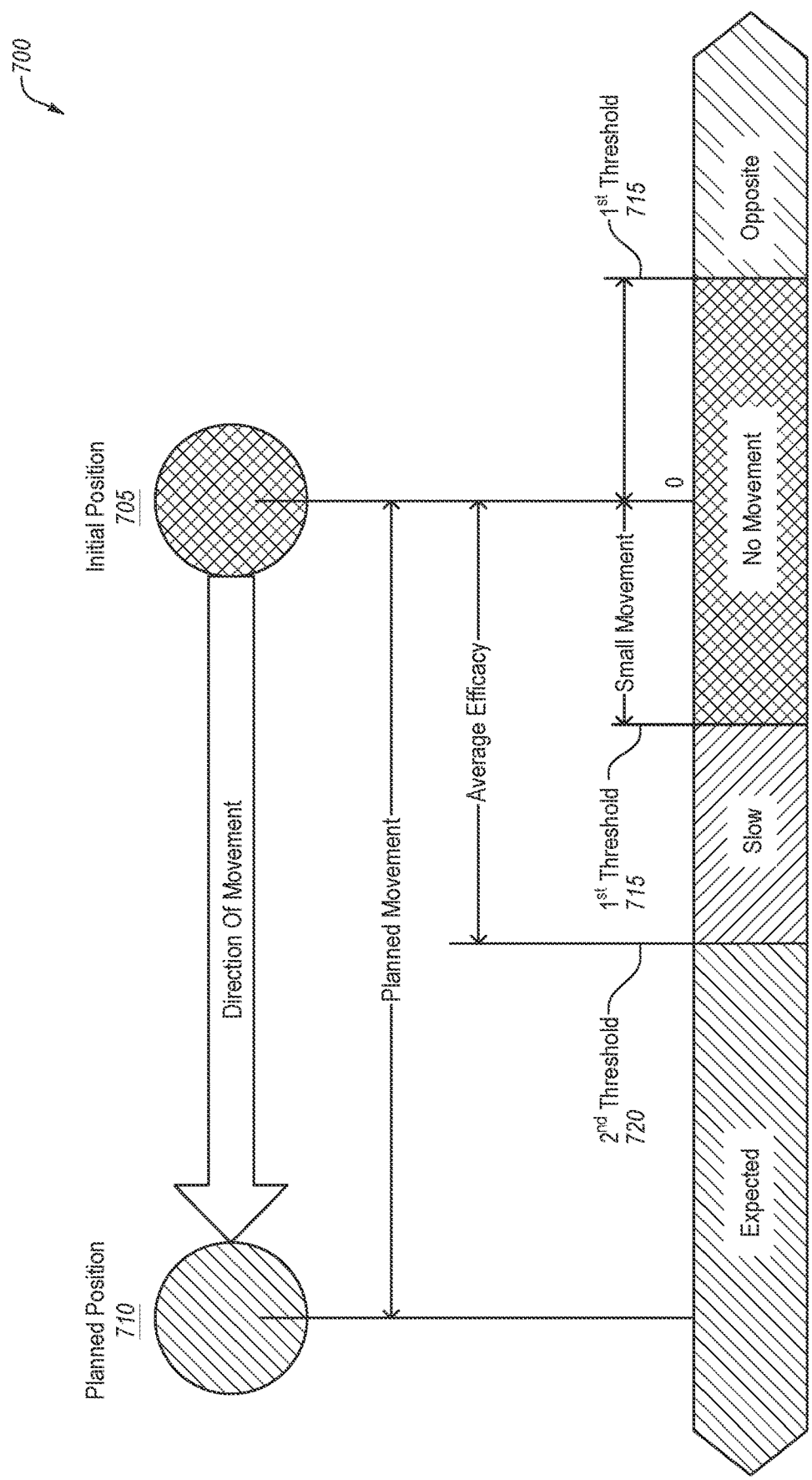

| Tooth ID | Bucco Lingual Translation, mm | | Mesio-Distal Translation, mm | | Intrusion / Extrusion, mm | | Angulation, Degrees | | Inclination, Degrees | | Rotation, Degrees | | Alert |
|---|---|---|---|---|---|---|---|---|---|---|---|---|---|
| | achieved | planned | achieved | planned | achieved | planned | achieved | planned | achieved | planned | achieved | planned | |
| 2 | 0.0 | 0.0 | 0.0 | 0.0 | 0.0 | 0.0 | 0.0 | 0.0 | 0.0 | 0.0 | 0.0 | 0.0 | |
| 3 | 0.0 | 0.0 | 0.0 | 0.0 | 0.0 | 0.0 | 0.0 | 0.0 | 0.0 | 0.0 | 0.0 | 0.0 | Small Movement |
| 4 | 0.0 | 0.1 Ling | 0.0 | 0.0 | 0.0 | 0.0 | 0.0 | 0.0 | 0.0 | 0.7 Dis | 0.0 | 0.8 Lin | Small Movement |
| 5 | 0.0 | 0.1 Buc | 0.0 | 0.0 | 0.0 | 0.0 | 0.0 | 0.4 Dis | 0.0 | 0.7 Dis | 0.0 | 0.7 Lin | Small Movement |
| 6 | 0.0 | 0.1 Buc | 0.0 | 0.1 Dist | 0.0 | 0.1 Ext | 0.1 Dis | 0.3 Dis | 0.0 | 0.1 Mes | 0.0 | 5.2 Lin | Small Movement |
| 7 | 0.0 | 0.1 Ling | 0.0 | 0.1 Dist | 0.0 | 0.0 | 0.1 Dis | 0.1 Dis | 0.0 | 0.7 Dis | 0.0 | 4.2 Buc | |
| 8 | 0.0 | 0.1 Ling | 0.0 | 0.0 | 0.0 | 0.0 | 0.1 Dis | 0.3 Mes | 0.0 | 0.7 Dis | 0.0 | 4.9 Buc | |
| 9 | 0.0 | 0.1 Ling | 0.0 | 0.0 | 0.0 | 0.1 Ext | 0.0 | 0.6 Mes | 0.0 | 0.1 Dis | 0.0 | 2.5 Buc | |
| 10 | 0.0 | 0.1 Ling | 0.0 | 0.0 | 0.0 | 0.1 Ext | 0.1 Dis | 0.0 | 0.0 | 0.4 Dis | 0.0 | 0.4 Buc | Small Movement |
| 11 | 0.0 | 0.1 Buc | 0.0 | 0.0 | 0.0 | 0.1 Ext | 0.0 | 0.1 Dis | 0.0 | 0.7 Mes | 0.0 | 5.9 Lin | |
| 12 | 0.0 | 0.1 Buc | 0.0 | 0.0 | 0.0 | 0.0 | 0.0 | 0.0 | 0.0 | 0.5 Mes | 0.0 | 0.0 | Small Movement |

FIG. 9

UPDATING AN ORTHODONTIC TREATMENT PLAN DURING TREATMENT

RELATED APPLICATIONS

This patent application is a continuation of U.S. patent application Ser. No. 17/003,857, filed Aug. 26, 2020, which is a continuation of U.S. patent application Ser. No. 15/839,730, filed Dec. 12, 2017, which claims the benefit under 35 U.S.C. § 119(e) of U.S. Provisional Application No. 62/449,982, filed Jan. 24, 2017, all of which are incorporated by reference herein.

TECHNICAL FIELD

Embodiments of the present invention relate to the field of dentistry and, in particular, to a system and method for adaptive orthodontic treatment.

BACKGROUND

Orthodontic treatment may be performed using a series of aligners and/or other orthodontic appliances. Generally, an orthodontist determines an orthodontic treatment plan and orders the series of aligners. A patient may wear a series of aligners in a predetermined sequence to adjust the patient's teeth from a starting configuration to a final target configuration. In many instances the teeth do not move as planned in the orthodontic treatment plan. However, it can be difficult for the orthodontist to identify which teeth might be moving according to plan and which teeth might be lagging or not moving according to plan. Additionally, it may also be difficult for the orthodontist to identify other deviations from the orthodontic treatment plan during treatment, to determine why teeth are not moving, and to determine how to remedy the deviation from the treatment plan.

BRIEF DESCRIPTION OF THE DRAWINGS

Embodiments of the present invention are illustrated by way of example, and not by way of limitation, in the figures of the accompanying drawings.

FIG. 7A is a diagram illustrating labeling of differences between actual tooth movement and planned tooth movement for an orthodontic treatment plan, in accordance with an embodiment.

FIG. 9 illustrates a table showing which teeth have positions that are in compliance with an orthodontic treatment plan and which teeth have positions that deviate from the orthodontic treatment plan, in accordance with an embodiment.

DETAILED DESCRIPTION

Figure 1A:
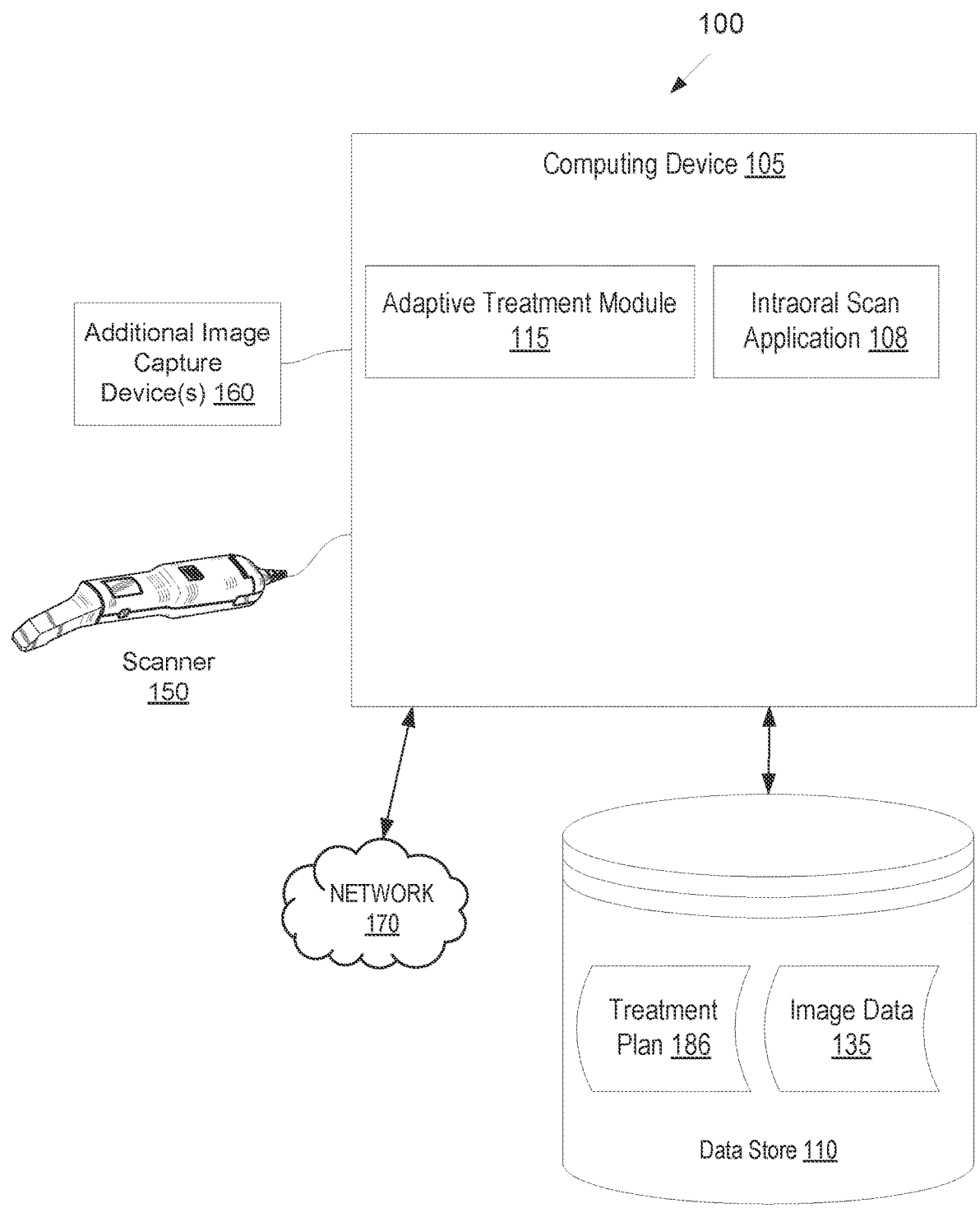
FIG. 1A illustrates one embodiment of a system for adaptive treatment planning and implementation of orthodontic treatment, in accordance with an embodiment.

Described herein are methods and apparatuses for performing adaptive orthodontic treatment. Orthodontic treatment is typically performed in a sequence of stages, and an orthodontic treatment plan may call for a patient's teeth to move by a specified amount for each of the stages. However, it can be difficult for a dental practitioner to assess whether treatment is progressing according to plan. For example, it can be difficult for the dental practitioner to determine whether the teeth are moving according to the treatment plan, whether some of the teeth are not moving according to the treatment plan, whether a planned class of occlusion will be achieved, whether a planned arch expansion is achieved, and so on. Additionally, it may also be difficult for the dental practitioner to assess whether there are any potential issues associated with the orthodontic treatment, to determine root causes for the deviation from the treatment plan, and to determine corrective actions.

Embodiments provide a method and system for assessing the actual progress of an orthodontic treatment plan that has a target end position (e.g., of assessing a patient's teeth during intermediate stages of a multi-stage orthodontic treatment plan). Image data for an actual condition of the patient's dental arch may be compared with a planned condition of the patient's dental arch (e.g., for an intermediate stage of the multi-stage orthodontic treatment plan). Based on this comparison, one or more clinical signs that the actual condition of the patient's dental arch has a deviation from the planned condition of the patient's dental arch (e.g., for the intermediate stage of a multi-stage orthodontic treatment plan) are identified. One or more probable root causes for the deviation are then determined based on the one or more clinical signs. Additionally, the clinical signs and/or the root causes may be used to determine whether a planned final position of the dental arch is achievable without corrective action. This may include checking a position of the teeth in each arch as well as the progress of the treatment plan, which may include additional parameters including occlusion, bite relation, arch expansion, and so on. Finally, one or more corrective actions for the orthodontic treatment plan may be determined based on the one or more probable root causes. The determined clinical signs, probable root causes and/or corrective actions may be presented to the dental practitioner for his or her consideration.

Some corrective actions may be modifications to the final treatment plan (e.g., to final teeth positions) and/or staging of the teeth positions in the treatment plan (if the treatment plan is a multi-stage treatment plan) that may be made automatically without any input from the dental practitioner. Staging refers to the sequence of movements from current or initial teeth positions to new teeth positions. Staging includes determining which tooth movements will be performed at different phases of treatment. Other corrective actions may be modifications to the treatment plan that are made after approval from the dental practitioner. Other corrective actions may require one or more actions or operations to be performed by the dental practitioner.

Embodiments provide significant advantages over traditional treatment techniques in orthodontics, and can improve treatment results of orthodontic treatment. Embodiments may provide a system that notifies a dental practitioner of progress deviation from an orthodontic treatment plan and informs the dental practitioner of actions to perform to ensure that a planned treatment outcome is achieved and/or how to adjust the planned treatment outcome to a more achievable goal. Accordingly, treatment plan efficacy is improved in embodiments. Such improvements in treatment plan efficacy are likely to result in increased patient satisfaction as well as reduced costs by reducing the number of consecutive refinements that are made to a treatment plan (and associated orders of additional aligners) during treatment.

Embodiments are discussed herein with reference to multi-stage treatment plans. However, such embodiments also apply to single stage orthodontic treatment plans that have a target end position. For example, image data may be generated some time after beginning a single stage orthodontic treatment plan. If the image data shows that progress of the single stage treatment plan is not as expected, then the target end position may be adjusted for the single stage treatment plan and/or one or more treatment parameters for reaching the target end position may be adjusted. Accordingly, it should be understood that all discussion of multi-stage treatment plans herein also applied to single stage treatment plans with target end positions and/or conditions.

Furthermore, some embodiments are discussed herein with reference to generation and use of aligners. As used herein, an aligner is an orthodontic appliance that is used to reposition teeth. It should be noted that embodiments also apply to other types of orthodontic appliances including but not limited to brackets and wires, retainers, or functional appliances. Accordingly, it should be understood that any discussion of aligners herein also applies to other types of orthodontic appliances.

FIG. 1A illustrates one embodiment of a system 100 for performing adaptive orthodontic treatment. In one embodiment, system 100 carries out one or more operations of below described in methods 200-600. System 100 includes a computing device 105 that may be coupled to a scanner 150, an additional image capture device 160, a network 170 and/or a data store 110.

Computing device 105 may include a processing device, memory, secondary storage, one or more input devices (e.g., such as a keyboard, mouse, tablet, speakers, or the like), one or more output devices (e.g., a display, a printer, etc.), and/or other hardware components. Computing device 105 may be connected to data store 110 either directly (as shown) or via network 170. The network 170 may be a local area network (LAN), a public wide area network (WAN) (e.g., the Internet), a private WAN (e.g., an intranet), or a combination thereof. The computing device 105 may be integrated into the scanner 150 or image capture device 160 in some embodiments to improve mobility.

Data store 110 may be an internal data store, or an external data store that is connected to computing device 105 directly or via network 170. Examples of network data stores include a storage area network (SAN), a network attached storage (NAS), and a storage service provided by a cloud computing service provider. Data store 110 may include a file system, a database, or other data storage arrangement.

In some embodiments, a scanner 150 for obtaining three-dimensional (3D) data of a dental site in a patient's oral cavity is operatively connected to the computing device 105. Scanner 150 may include a probe (e.g., a hand held probe) for optically capturing three dimensional structures (e.g., by confocal focusing of an array of light beams). One example of such a scanner 150 is the iTero® intraoral digital scanner manufactured by Align Technology, Inc. Other examples of intraoral scanners include the 3M True Definition Scanner and the Cerec Omnicam manufactured by Sirona®.

The scanner 150 may be used to perform an intraoral scan of a patient's oral cavity. An intraoral scan application 108 running on computing device 105 may communicate with the scanner 150 to effectuate the intraoral scan. A result of the intraoral scan may be a sequence of intraoral images that have been discretely generated (e.g., by pressing on a "generate image" button of the scanner for each image). Alternatively, a result of the intraoral scan may be one or more videos of the patient's oral cavity. An operator may start recording the video with the scanner 150 at a first position in the oral cavity, move the scanner 150 within the oral cavity to a second position while the video is being taken, and then stop recording the video. The scanner 150 may transmit the discrete intraoral images or intraoral video (referred to collectively as image data 135) to the computing device 105. Computing device 105 may store the image data 135 in data store 110. Alternatively, scanner 150 may be connected to another system that stores the image data in data store 110. In such an embodiment, scanner 150 may not be connected to computing device 105.

According to an example, a user (e.g., a practitioner) may subject a patient to intraoral scanning. In doing so, the user may apply scanner 150 to one or more patient intraoral locations. The scanning may be divided into one or more segments. As an example the segments may include a lower buccal region of the patient, a lower lingual region of the patient, a upper buccal region of the patient, an upper lingual region of the patient, one or more preparation teeth of the patient (e.g., teeth of the patient to which a dental device such as a crown or an orthodontic alignment device will be applied), one or more teeth which are contacts of preparation teeth (e.g., teeth not themselves subject to a dental device but which are located next to one or more such teeth or which interface with one or more such teeth upon mouth closure), and/or patient bite (e.g., scanning performed with closure of the patient's mouth with scan being directed towards an interface area of the patient's upper and lower teeth). Via such scanner application, the scanner 150 may provide image data (also referred to as scan data) 135 to computing device 105. The image data 135 may include 2D intraoral images and/or 3D intraoral images.

The image data 135 may be used to generate a virtual model (e.g., a virtual 2D model or virtual 3D model) of the actual condition of the patient's dental arch in some embodiments. To generate the virtual model, intraoral scan application 108 may register (i.e., "stitch" together) the intraoral images generated from the intraoral scan session. In one embodiment, performing image registration includes capturing 3D data of various points of a surface in multiple images (views from a camera), and registering the images by computing transformations between the images. The images may then be integrated into a common reference frame by applying appropriate transformations to points of each registered image.

In one embodiment, image registration is performed for each pair of adjacent or overlapping intraoral images (e.g., each successive frame of an intraoral video). Image registration algorithms are carried out to register two adjacent intraoral images, which essentially involves determination of the transformations which align one image with the other. Image registration may involve identifying multiple points in each image (e.g., point clouds) of an image pair, surface fitting to the points of each image, and using local searches around points to match points of the two adjacent images. For example, intraoral scan application 108 may match points of one image with the closest points interpolated on the surface of the other image, and iteratively minimize the distance between matched points. Intraoral scan application 108 may also find the best match of curvature features at points of one image with curvature features at points interpolated on the surface of the other image, without iteration. Intraoral scan application 108 may also find the best match of spin-image point features at points of one image with spin-image point features at points interpolated on the surface of the other image, without iteration. Other techniques that may be used for image registration include those based on determining point-to-point correspondences using other features and minimization of point-to-surface distances, for example. Other image registration techniques may also be used.

Many image registration algorithms perform the fitting of a surface to the points in adjacent images, which can be done in numerous ways. Parametric surfaces such as Bezier and B-Spline surfaces are most common, although others may be used. A single surface patch may be fit to all points of an image, or alternatively, separate surface patches may be fit to any number of a subset of points of the image. Separate surface patches may be fit to have common boundaries or they may be fit to overlap. Surfaces or surface patches may be fit to interpolate multiple points by using a control-point net having the same number of points as a grid of points being fit, or the surface may approximate the points by using a control-point net which has fewer number of control points than the grid of points being fit. Various matching techniques may also be employed by the image registration algorithms.

In one embodiment, intraoral scan application 108 may determine a point match between images, which may take the form of a two dimensional (2D) curvature array. A local search for a matching point feature in a corresponding surface patch of an adjacent image is carried out by computing features at points sampled in a region surrounding the parametrically similar point. Once corresponding point sets are determined between surface patches of the two images, determination of the transformation between the two sets of corresponding points in two coordinate frames can be solved. Essentially, an image registration algorithm may compute a transformation between two adjacent images that will minimize the distances between points on one surface, and the closest points to them found in the interpolated region on the other image surface used as a reference.

Intraoral scan application 108 repeats image registration for all adjacent image pairs of a sequence of intraoral images to obtain a transformation between each pair of images, to register each image with the previous one. Intraoral scan application 108 then integrates all images into a single virtual 3D model by applying the appropriate determined transformations to each of the images. Each transformation may include rotations about one to three axes and translations within one to three planes.

In addition to image data 135 including data captured by scanner 150 and/or data generated from such captured data (e.g., a virtual 3D model), image data 135 may also include data from one or more additional image capture devices 160. The additional image capture devices 160 may include an x-ray device capable of generating standard x-rays (e.g., bite wing x-rays), panoramic x-rays, cephalometric x-rays, and so on. The additional image capture devices 160 may additionally or alternatively include an x-ray device capable of generating a cone beam computed tomography (CBCT) scan. Additionally, or alternatively, the additional image capture devices 160 may include a standard optical image capture device (e.g., a camera) that generates two-dimensional or three-dimensional images or videos of a patient's oral cavity and dental arch. For example, the additional image capture device 160 may be a mobile phone, a laptop computer, an image capture accessory attached to a laptop or desktop computer (e.g., a device that uses Intel® RealSense™ 3D image capture technology), and so on. Such an additional image capture device 160 may be operated by a patient or a friend or family of the patient, and may generate 2D or 3D images that are sent to the computing device 105 via network 170. Accordingly, image data 135 may include 2D optical images, 3D optical images, virtual 2D models, virtual 3D models, 2D x-ray images, 3D x-ray images, and so on.

In embodiments, the intraoral scan is performed during an intermediate stage of a multi-stage orthodontic treatment plan. Alternatively, or additionally, other image data 135 may be generated during the intermediate stage of the multi-stage orthodontic treatment plan.

The multi-stage orthodontic treatment plan may be for a multi-stage orthodontic treatment or procedure. The term orthodontic procedure refers, inter alia, to any procedure involving the oral cavity and directed to the design, manufacture or installation of orthodontic elements at a dental site within the oral cavity, or a real or virtual model thereof, or directed to the design and preparation of the dental site to receive such orthodontic elements. These elements may be appliances including but not limited to brackets and wires, retainers, aligners, or functional appliances. Different aligners may be formed for each treatment stage to provide forces to move the patient's teeth. The shape of each aligner is unique and customized for a particular patient and a particular treatment stage. The aligners each have teeth-receiving cavities that receive and resiliently reposition the teeth in accordance with a particular treatment stage.

The multi-stage orthodontic treatment plan for a patient may have initially been generated by a dental practitioner (e.g., an orthodontist) after performing a scan of an initial pre-treatment condition of the patient's dental arch. The treatment plan may also begin at home (based on a patient scan of himself) or at a scanning center. The treatment plan might be created automatically or by a professional (including an Orthodontist) in a remote service center. The scan may provide surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.). Image data from the initial intraoral scan may be used to generate a virtual three-dimensional (3D) model or other digital representation of the initial or starting condition for the patient's upper and/or lower dental arches.

The dental practitioner may then determine a desired final condition for the patient's dental arch. The final condition of the patient's dental arch may include a final arrangement, position, orientation, etc. of the patient's teeth, and may additionally include a final bite position, a final occlusion surface, a final arch length, and so on. A movement path of some or all of the patient's teeth and the patient bite changes from starting positions to planned final positions may then be calculated. In many embodiments, the movement path is calculated using one or more suitable computer programs, which can take digital representations of the initial and final positions as input, and provide a digital representation of the movement path as output. The movement path for any given tooth may be calculated based on the positions and/or movement paths of other teeth in the patient's dentition. For example, the movement path can be optimized based on minimizing the total distance moved, preventing collisions between teeth, avoiding tooth movements that are more difficult to achieve, or any other suitable criteria. In some instances, the movement path can be provided as a series of incremental tooth movements that, when performed in sequence, result in repositioning of patient's teeth from the starting positions to the final positions.

Multiple treatment stages may then be generated based on the determined movement path. Each of the treatment stages can be incremental repositioning stages of an orthodontic treatment procedure designed to move one or more of the patient's teeth from a starting tooth arrangement for that treatment stage to a target arrangement for that treatment stage. A different 3D model of a target condition for a treatment stage may be generated for each of the treatment stages. One or a set of orthodontic appliances (e.g., aligners) are then fabricated based on the generated treatment stages (e.g., based on the 3D models of the target conditions for each of the treatment stages). For example, a set of appliances can be fabricated, each shaped to accommodate a tooth arrangement specified by one of the treatment stages, such that the appliances can be sequentially worn by the patient to incrementally reposition the teeth from the initial arrangement to the target arrangement. The configuration of the aligners can be selected to elicit the tooth movements specified by the corresponding treatment stage.

Sometimes it can be difficult to determine at the beginning of an orthodontic treatment what the final treatment plan should be. There are multiple reasons for this. For example, in some cases teeth do not move as expected due to the specific biology of a particular patient. Additionally, sometimes patient compliance with a treatment plan is suboptimal (e.g., the patient does not wear his or her aligners as instructed). Accordingly, it can be beneficial in some embodiments to generate more than one treatment plan prior to beginning treatment. In some embodiments, a set of multi-stage orthodontic treatment plans is generated before treatment is initiated. The set of treatment plans may include a first treatment plan that has optimal target conditions. The first treatment plan may be a most aggressive treatment plan of the set (e.g., may call for the most movement of teeth out of any of the treatment plans in the set). The set of treatment plans may additionally include treatment plans that are less aggressive (e.g., that have alternative target conditions that include less change to the dental arch) and/or other treatment plans that are more aggressive. Additionally, or alternatively, the first treatment plan may call for fewer physical operations or procedures on the patient's mouth, and other treatment plans may call for more physical operations or procedures. For example, the first treatment plan may call for generation of a 5 mm arch length by distalization of the patient's molars, while a second treatment plan may call for generation of a 4 mm arch length by distalization of the patient's molars and additionally call for interproximal reduction or a tooth extraction.

The image data 135 received during the intermediate stage in the multi-stage orthodontic treatment plan 186 may be compared by an adaptive treatment module 115 to data in the treatment plan 186. In one embodiment, adaptive treatment module 115 compares a first virtual 3D model of the actual current condition of the patient's dental arch that is included in the image data (e.g., that was generated based on an intraoral scan of the patient's dental arch) to a second virtual 3D model of the planned condition of the patient's dental arch for the current intermediate stage of the multi-stage orthodontic treatment plan. Based on the comparison of the image data 135 to the intermediate stage of the orthodontic treatment plan 186, adaptive treatment module 115 determines any clinical signs of deviation between the actual condition of the patient's dental arch and the planned condition of the patient's dental arch for the current treatment stage. The adaptive treatment module 115 determines one or more root causes associated with the one or more clinical signs. The adaptive treatment module 115 may additionally determine one or more corrective actions from the one or more root causes. In some instances, a determined corrective action may include switching from a first treatment plan that was started to a second treatment plan, where both treatment plans were generated prior to initiation of the first treatment plan. Additionally, the adaptive treatment module 115 may determine whether a planned final condition of the dental arch remains achievable in view of the determined clinical signs, root causes and/or corrective actions.

In some embodiments, the image data 135 received during the intermediate stage in the multi-stage orthodontic treatment plan 186 may be used to analyze a fit of a next aligner based on the actual current condition of the dental arch (e.g., based on current teeth positions, occlusion, arch width, and so on). If the next aligner will not have an optimal fit on the patient's dental arch (e.g., will not fit onto the dental arch or will fit but will not apply the desired forces on one or more teeth), then new aligners may be designed based on updating the treatment plan staging.

Figure 1B:
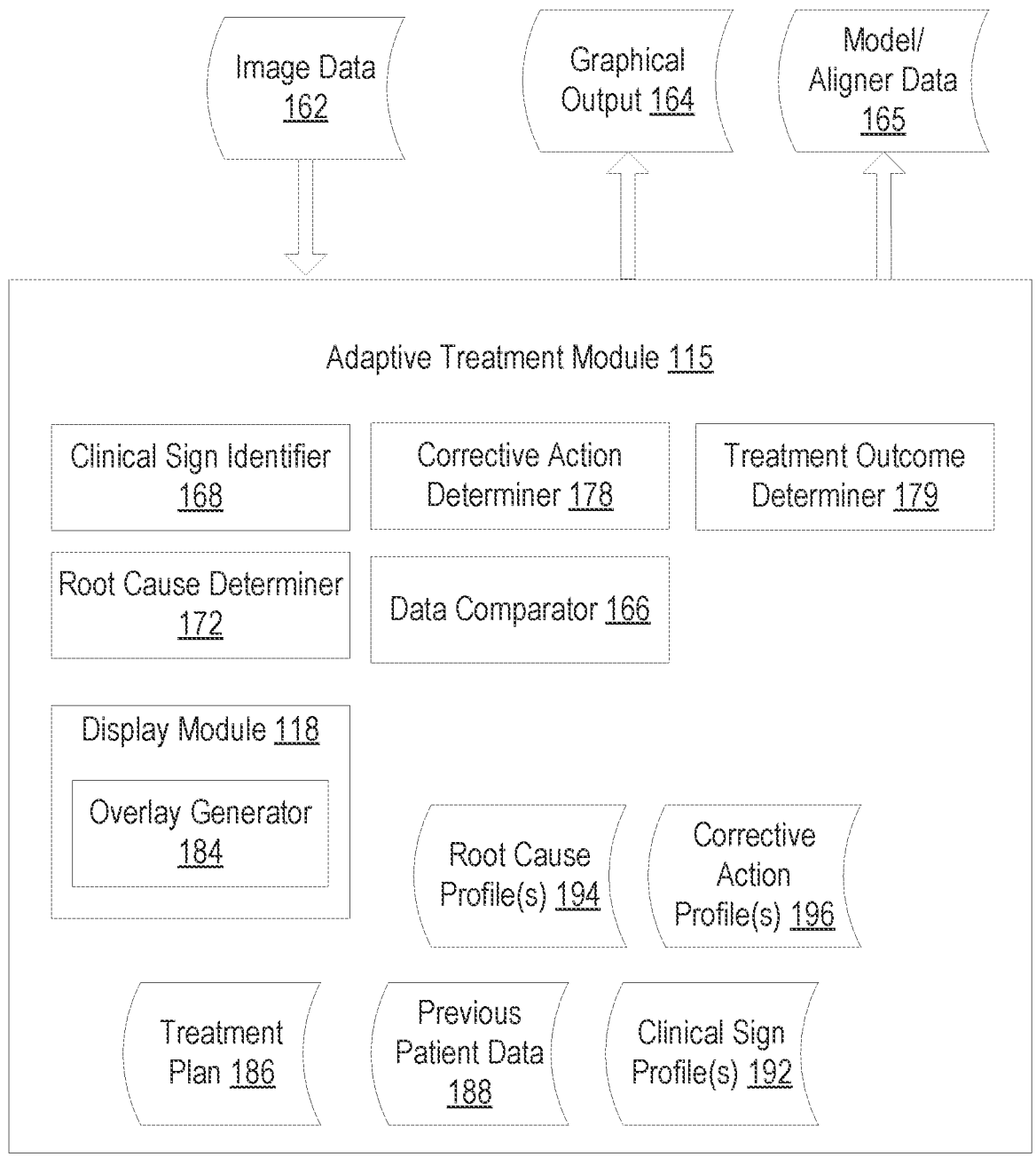
FIG. 1B illustrates one embodiment of an adaptive treatment module for orthodontic treatment, in accordance with an embodiment.

FIG. 1B illustrates one embodiment of an adaptive treatment module 115 for orthodontic treatment, in accordance with an embodiment. In one embodiment, the adaptive treatment module 115 includes a data comparator 166, a clinical sign identifier 168, a root cause determiner 172, a corrective action determiner 178, a treatment outcome determiner 179 and a display module 118. Alternatively, one or more of the data comparator 166, clinical sign identifier 168, root cause determiner 172, corrective action determiner 178, treatment outcome determiner 179 and/or display module 118 may be combined into a single module or further divided into additional modules.

Data comparator 166 compares received image data 162 with a treatment plan 186. The image data may represent an actual condition of a patient's dental arch during a current stage in the treatment plan 186, and the treatment plan 186 may be a multi-stage treatment plan that includes a planned condition of the dental arch for the current stage. A representation of the dental arch in the image data 162 may be registered with a representation of the dental arch in the treatment plan. For example, the image data 162 may include a virtual 3D model of the actual condition of the patient's dental arch and the treatment plan may include an additional virtual 3D model of the planned condition of the patient's dental arch for the current stage of treatment.

Data comparator 166 may additionally compare the received image data 162 with previous patient data 188. The previous patient data 188 may include past data regarding the patient (e.g., medical records), previous scanned images or models of the patient, past x-rays, 2D intraoral images, 3D intraoral images, virtual 2D models, virtual 3D models, or the like.

Comparison of the image data 162 with the treatment plan 186 may include performing image registration between the image data 162 and additional image data included in the treatment plan 186. The image registration involves determination of the transformations which align one image with the other. Image registration may involve identifying multiple points, point clouds, edges, corners, etc. in each image of an image pair, surface fitting to the points of each image, and using local searches around points to match points of the two images. For example, data comparator 166 may match points of one image with the closest points interpolated on the surface of the other image, and iteratively minimize the distance between matched points. Data comparator 166 may also find the best match of curvature features at points of one image with curvature features at points interpolated on the surface of the other image, with or without iteration. Data comparator 166 may also find the best match of spin-image point features at points of one image with spin-image point features at points interpolated on the surface of the other image, with or without iteration. Other techniques that may be used for image registration include those based on determining point-to-point correspondences using other features and minimization of point-to-surface distances, for example. Other image registration techniques may also be used.

Many image registration algorithms perform the fitting of a surface to the points in adjacent images, which can be done in numerous ways. Parametric surfaces such as Bezier and B-Spline surfaces are common, although others may be used. A single surface patch may be fit to all points of an image, or alternatively, separate surface patches may be fit to any number of a subset of points of the image. Separate surface patches may be fit to have common boundaries or they may be fit to overlap. Surfaces or surface patches may be fit to interpolate multiple points by using a control-point net having the same number of points as a grid of points being fit, or the surface may approximate the points by using a control-point net which has fewer number of control points than the grid of points being fit. Various matching techniques may also be employed by the image registration algorithms.

In one embodiment, data comparator 166 may determine a point match between images, which may take the form of a two dimensional (2D) curvature array. A local search for a matching point feature in a corresponding surface patch of another image is carried out by computing features at points sampled in a region surrounding the parametrically similar point. Once corresponding point sets are determined between surface patches of the two images, determination of the transformation between the two sets of corresponding points in two coordinate frames can be solved. Essentially, an image registration algorithm may compute a transformation between two images that will minimize the distances between points on one surface, and the closest points to them found in the interpolated region on the other image surface can be used as a reference. The transformation may include rotations and/or translational movement in up to six degrees of freedom (e.g., rotations about one to three axes and translations within one to three planes). Additionally, the transformation may include changes in image size (e.g., zooming in or out) for one or both of the images. A result of the image registration may be a transformation matrix that indicates the rotations, translations and/or size changes that will cause the one image to correspond to the other image.

Once the image data 162 is registered with image data in the treatment plan 186 (or image data in the previous patient data 188), differences between the two sets of image data are determined. In one embodiment, data comparator 166 compares the two images to determine differences there between. This may include performing one or more image detection and/or image recognition techniques to identify features in the image data 162 and corresponding features in image data from the treatment plan 186 or previous patient data 188. For the sake of comparison, data comparator 166 may perform teeth segmentation to identify part or all of the teeth in one or both dental arches of the patient. In an example, data comparator 166 may identify a dental arch, individual teeth, a gum line, gums, etc. in the image data 162 and additional image data. Differences between the two images may be then determined, such as differences in position and/or orientation of one or more teeth, differences in a palate width, differences in an arch length, differences regarding placement and type of attachments, differences regarding bite position, differences regarding an occlusion surface, and so on.

In one embodiment, the data comparator 166 identifies a feature in the image data 162 to use to correlate the image data to the additional image data. The reference feature may be a portion of a tooth, a gum line, a specific tooth, or any feature of a dental arch including the palate and or features on the palate. The data comparator 166 may then compare the feature in the dental arch of the image data 162 to the feature as represented in the additional data associated with the dental arch. For example, if the feature is a tooth, the data comparator 166 may compare the tooth in the image data 166 to the tooth in the treatment plan for the current treatment stage. The data comparator 166 may then determine a difference between a planned movement of the tooth and an achieved movement of the tooth.

Additionally, data comparator 166 may determine whether an attachment is not attached to a tooth as specified in the treatment plan 186, whether an attachment on a tooth is in an incorrect location or has an incorrect shape, whether a planned amount of interproximal reduction (IPR) was performed, and so on. Other differences between the actual condition of the dental arch as represented in the image data 162 and the planned condition of the dental arch as represented in the treatment plan 186 may also be determined.

Clinical sign identifier 168 identifies one or more clinical signs based on the comparison between the actual condition of the dental arch and the planned condition of the dental arch for the current treatment stage. Each clinical sign is an indication of a difference between the actual condition of the dental arch and the planned condition of the dental arch. Clinical signs may differ in severity. For example, a first clinical sign may be an indication that a tooth has moved less than planned, a second clinical sign may be an indication that a tooth has not moved, and a third clinical sign may be an indication that a tooth has moved in an opposite direction to what was planned. Note that the tooth might have moved "as planned" in some direction (e.g., distally) and not as planned in another direction (e.g., rotation). Tables 1-2 below provide an example of clinical signs that may be identified. The clinical signs are divided into different categories of clinical signs in the tables.

TABLE 1

Clinical signs for interproximal
reduction, attachments, and tooth movements

| Category | Clinical Sign |
| --- | --- |
| Interproximal reduction | Amount of IPR performed is less than planned |
| Interproximal reduction | Amount of IPR performed is more than planned |
| Interproximal reduction | IPR was not performed |
| Attachment | Attachment shape does not correspond to designated attachment shape |
| Attachment | Attachment bonded in wrong position on tooth |
| Attachment | Attachment not placed on designated tooth |
| Tooth movement | Tooth movement less (slower) than planned |
| Tooth movement | Tooth movement greater (faster) than planned |
| Tooth movement | Tooth experienced unplanned tooth movement |
| Tooth movement | Tooth movement opposite to what was planned |
| Tooth movement | Intermediate space between teeth not created as planned |
| Tooth movement | Alignment of teeth is worse than planned |
| Tooth movement | Alignment of teeth is worse than initial alignment of the teeth |
| Tooth movement | Tooth did not move |

TABLE 2

Clinical signs for occlusion, root positions, gingival tissue, tooth geometry and global orthodontic measurements

| | |
| --- | --- |
| Occlusion | Unplanned contacts between upper and lower teeth in specific area (e.g., anterior contacts) |
| Occlusion | Unplanned vertical spaces in specific area (e.g., posterior open bite) |
| Occlusion | Tooth movement is blocked by other tooth from opposite jaw |
| Root positions | Root position not as planned |
| Root positions | Distance between roots of adjacent teeth have less than threshold |
| Root positions | Distance between root of tooth and unerupted tooth less than threshold |
| Root positions | Unerupted tooth has grown towards an erupted tooth |
| Root positions | Root of tooth has reduced size (decrease in at least one dimension) |
| Root positions | Distance between root of tooth and bone boundary less than threshold |
| Gingival tissue | Recession of gingival tissue observed |
| Tooth geometry | Difference in tooth geometry identified (e.g., broken tooth, unexpected crown, unexpected filling, filling missing) |
| Tooth geometry | Tooth is missing |
| Tooth geometry | New tooth is present (has erupted) |
| Tooth geometry | Tooth eruption is greater than planned |
| Global orthodontic measurements | Progress toward final bite class slower than expected |
| Global orthodontic measurements | Progress toward final bite class faster than expected |
| Global orthodontic measurements | Overbite correction less than expected |
| Global orthodontic measurements | Overbite correction greater than expected |
| Global orthodontic measurements | Open bite correction less than expected |
| Global orthodontic measurements | Open bite correction greater than expected |
| Global orthodontic measurements | Midlines of upper and lower arches not aligned as planned |
| Global orthodontic measurements | Midline not aligned with face |
| Global orthodontic measurements | Palatal expansion less than planned |
| Global orthodontic measurements | Palatal expansion greater than planned |
| Global orthodontic measurements | Residual crowding greater than planned |
| Global orthodontic measurements | Residual crowding less than planned |

Some example clinical signs related to interproximal reduction, attachments, tooth movements and global orthodontic measurements are shown. Interproximal reduction (IPR) refers to the removal of tooth material between two adjacent teeth. The performance of IPR increases an amount of space that is available and may provide room for teeth to move. A treatment plan may call for a dental practitioner to perform a specific amount of IPR so as to generate enough room to enable planned tooth movements. However, the dental practitioner in some instances may forget to perform IPR or may choose to omit the IPR. For example, the dental practitioner may not perform the IPR if a patient is reluctant to have IPR performed. If the IPR is not performed as planned, then planned tooth movements may be unachievable or a staging to reach a planned final tooth arrangement may need to be adjusted.

Some types of tooth movements are achieved or facilitated by attachments placed on one or more teeth. The attachments enable additional forces to be applied to teeth that might not be otherwise obtainable. For example, some attachments enable a torque to be applied to a tooth to facilitate rotational motion of the tooth. Other types of tooth movements may also be facilitated by attachments. If the attachments are placed in the wrong positions, are not placed, or have the wrong shape, then the planned forces may not be applied to the teeth, and the planned teeth movement may not be achieved.

Clinical signs for tooth movement may be divided into different types and amounts of deviation between planned tooth position and achieved tooth position. For example tooth movement clinical signs may include an indication of one or more teeth that have moved as planned, an indication of one or more teeth that have moved less than planned, an indication of one or more teeth that have experienced motion that is contrary to a planned motion, and an indication of one or more teeth that have not moved. Additionally, tooth movement clinical signs may be subdivided into tooth movement in different directions. For example, first tooth movement clinical signs may indicate whether a tooth has moved less than planned, not at all, or in an opposite direction than planned in a first direction (e.g., an anterior-posterior direction), second tooth movement clinical signs may indicate whether a tooth has moved less than planned, not at all, or in an opposite direction than planned in a second direction (e.g., a left-right direction), third tooth movement clinical signs may indicate whether a tooth has rotated less than planned, not at all, or in an opposite direction than planned about a first axis, and/or fourth tooth movement clinical signs may indicate whether a tooth has rotated less than planned, not at all, or in an opposite direction than planned about a second axis.

Global orthodontic measurements may include upper or lower residual crowding. If crowding is present in the treatment plan and achieved crowding is worse than expected, then a clinical sign may indicate this. Global orthodontic measurements may include a residual deep bite. If a deep bite is present in the treatment plan and achieved overbite is worse than expected, then a clinical sign may indicate this. Global orthodontic measurements may include a residual open bite. If an open bite is present in the treatment plan and achieved overbite is worse than expected, then a clinical sign may indicate this. Global orthodontic measurements may include a residual posterior open bite. If the posterior open bite is present in the treatment plan and achieved posterior open bite is worse than expected, then a clinical sign may indicate this. Global orthodontic measurements may include a posterior open bite. If the treatment plan does not include a posterior open bite and an actual condition of the patient's dental arch includes a posterior open bite, then a clinical sign may indicate this. Global orthodontic measurements may include an underachieved upper or lower expansion. If expansion is present in the treatment plan and achieved expansion is less than expected, then a clinical sign may indicate this. Global orthodontic measurements may include underachieved upper or lower anterior-posterior correction. If anterior-posterior correction is present in the treatment plan and achieved correction is less than expected, then a clinical sign may indicate this.

Figure 7B:
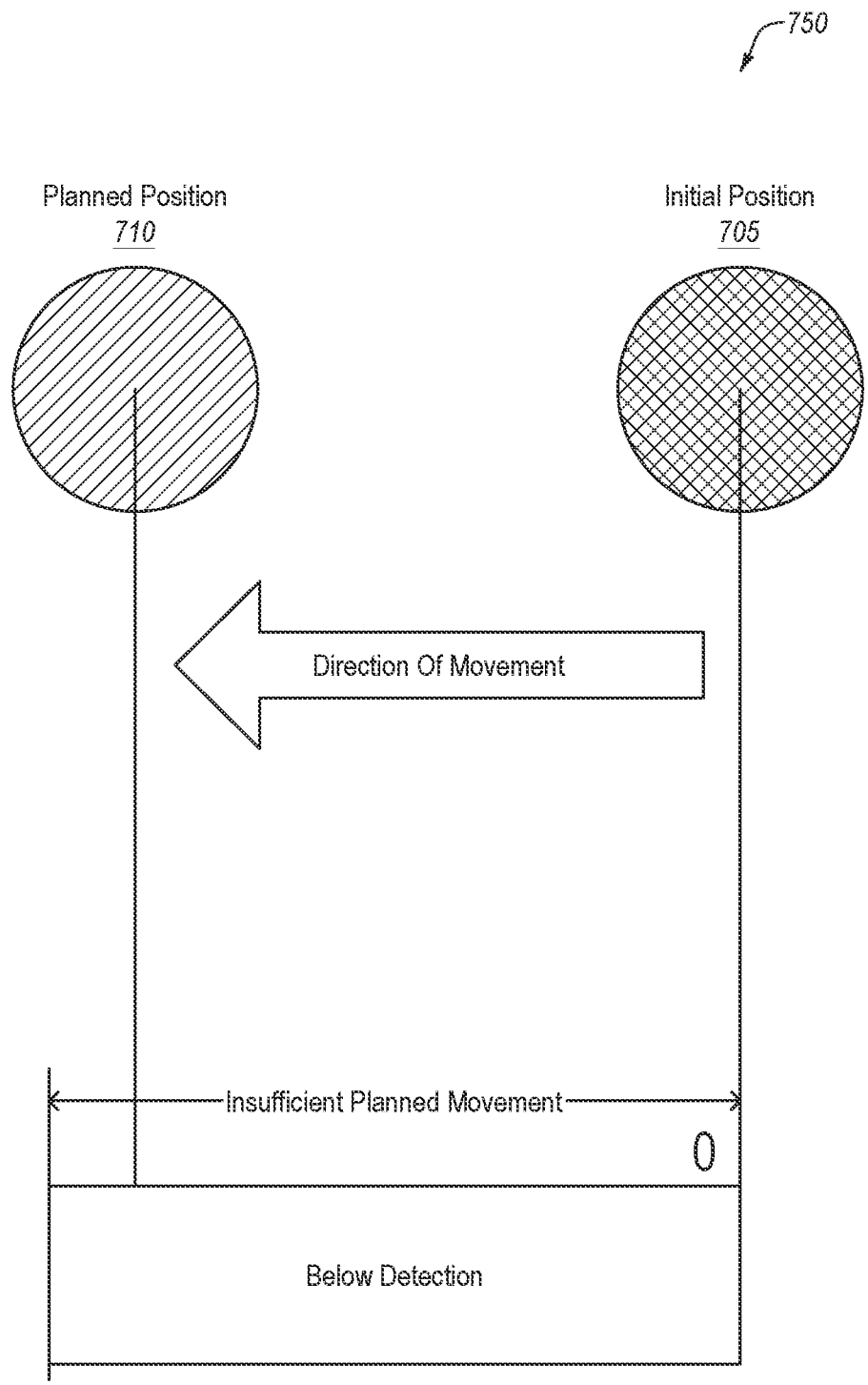
FIG. 7B is a diagram illustrating a planned tooth movement for an orthodontic treatment plan, in accordance with an embodiment.

FIG. 7A illustrates a chart 700 showing different types of clinical signs regarding tooth movement. FIG. 7B is a diagram illustrating a chart 750 showing a planned tooth movement for an orthodontic treatment plan, in accordance with an embodiment. A treatment plan may call for a particular amount of tooth movement between an initial position 705 and a planned position 710 at an intermediate treatment stage. For translational movement the planned movement may be reflected in terms of distance (e.g., mm or inches) and for rotational movement the planned movement may be reflected in terms of degrees of rotation. Translational movement can include movement in a plane defined by the arch (e.g., movement along the arch that affects the separation between teeth) and can additionally or alternatively include movement outside of the plane (e.g., raising a tooth or lowering a tooth). If the actual tooth position deviates from the initial position 705 by less than a first threshold 715 (compliance threshold), then the clinical sign that the tooth has not changed position may be determined. It may be determined that the tooth has not moved if the tooth movement is within the first threshold 715 in the planned direction of movement and/or in an opposite direction of movement from the planned direction of movement. If tooth movement was less than planned and the actual tooth position exceeds the first threshold 715 but is less than a second threshold 720, then a clinical sign of "tooth movement less than planned" may be determined. Alternatively, or additionally, the threshold may be based on a difference between a planned movement and an actual movement (e.g., if actual tooth position deviated from planned tooth position by more than a threshold amount, then the clinical sign of "tooth movement less than planned" may be determined. If the detected movement exceeds the second threshold 720, then tooth movement may be normal. Alternatively, or additionally, if the actual tooth position deviates from the planned tooth position by less than a threshold, then the tooth movement may be identified as normal, and no clinical sign may be determined. If the actual position shows movement in an opposite direction from the planned movement and exceeds the first threshold 715, then the clinical sign of "tooth movement opposite to what was planned," may be determined. Referring to FIG. 7B, if the actual movement exceeded the planned position, then it may be determined that the treatment plan included an insufficient planned movement. If the actual position shows movement that is greater than what was planned and the actual position deviates from the planned position 710 by more than a threshold, then a clinical sign of "tooth movement greater (faster) than planned" may be determined.

In one embodiment, display module 118 of FIG. 1B generates a 2D or 3D model of the patient's dental arch. Alternatively, display module 118 may generate a generic image of a dental arch. An overlay generator 184 of the display module 118 may generate a graphical overlay (e.g., a color overlay) that marks the different clinical signs in the 2D or 3D model (or generic image). For example, a first color (e.g., purple) may be used to indicate teeth associated with a clinical sign of "tooth movement opposite to what was planned," a second color (e.g., yellow) may be used to indicate teeth associated with a clinical sign of "tooth movement less than planned," a third color (e.g., green) may be used to indicate teeth that have moved as planned, and a fourth color (e.g., blue) may be used to indicate teeth associated with a clinical sign of "tooth movement greater than planned." Other types of labels or flags may be used to present and/or call out the various clinical signs, such as numerical labels.

Figure 8:
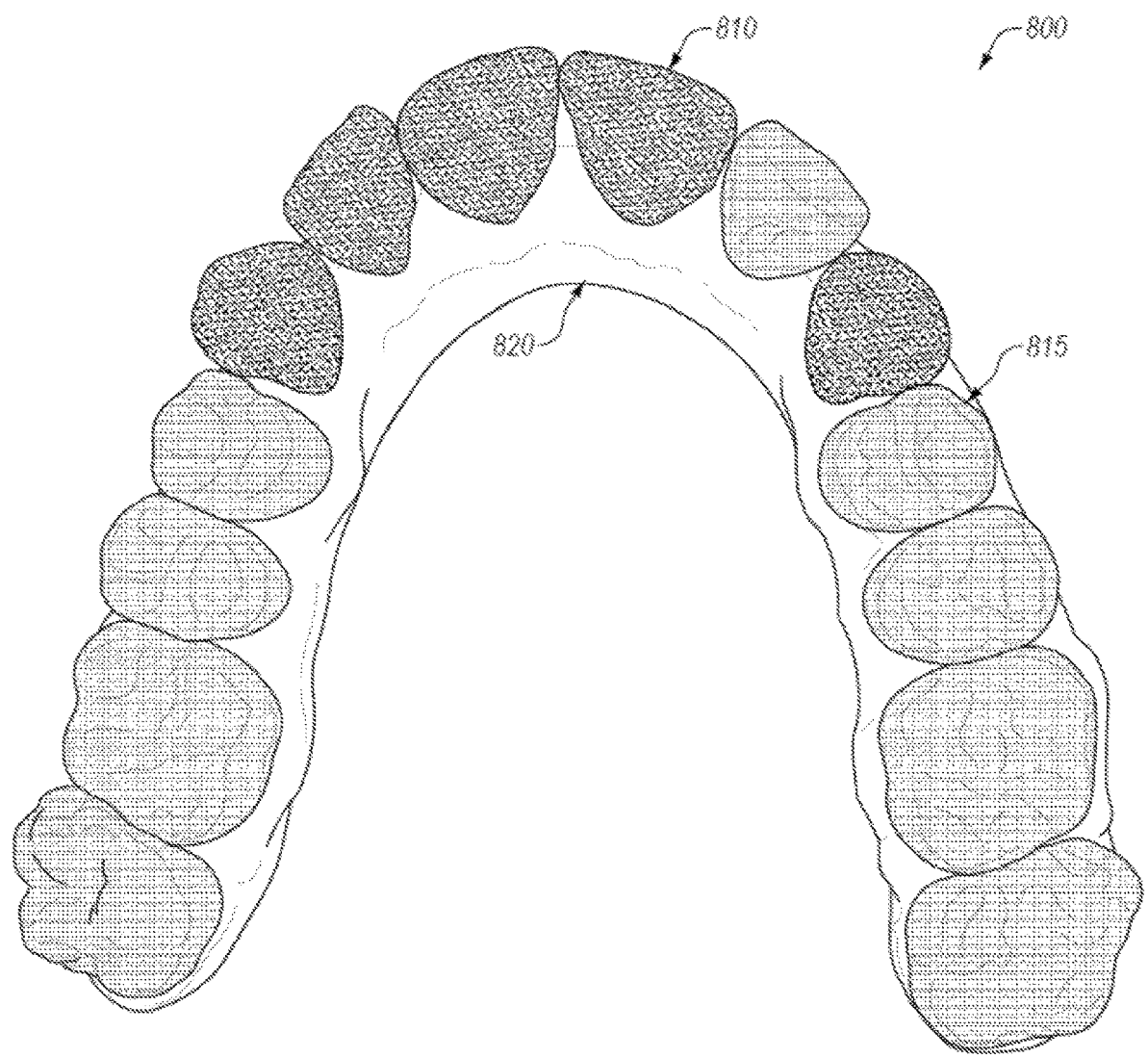
FIG. 8 illustrates a dental arch with a color overlay indicating which teeth have positions that are in compliance with an orthodontic treatment plan and which teeth have positions that deviate from the orthodontic treatment plan, in accordance with an embodiment.

FIG. 8 illustrates a virtual model of a patient's dental arch 800 in which the teeth are color coded based on associated clinical signs. As shown, teeth that have moved as planned 815 are shown with a first color and/or other marking (e.g., green and/or a first hatching) and teeth that have moved less than planned are shown with a second color and/or other marking (e.g., orange or yellow and/or a second hatching). Additionally, gums 820 may be shown with a third color and/or other marking (e.g., red).

FIG. 9 illustrates a table showing which teeth have positions that are in compliance with an orthodontic treatment plan and which teeth have positions that deviate from the orthodontic treatment plan, in accordance with an embodiment. As shown, the table includes a different row for each tooth, and different columns for each type of movement that is measured for the teeth. The tooth rows may be labeled by tooth number or tooth ID. The different types of tooth motion that are measured include bucco-lingual translational motion, mesio-distal translational motion, intrusion/extrusion tooth motion, angulation, inclination, and rotation. Angulation, inclination and rotation may each be considered as rotation about a different axis, and may be measured in degrees or rotation. The table shows the achieved tooth motion and planned tooth motion for each type of tooth motion. Additionally, the table includes an alert column that indicates any clinical signs that have been identified.

Referring back to FIG. 1B, and with regards to Table 2, some example clinical signs related to global orthodontic measurements, occlusion, root positions, gingival tissue and tooth geometry are provided. The clinical signs related to global orthodontic measurements may be associated with overbite, open bite, under bite, arch length, midlines, palatal expansion, tooth crowding, and so on. The dental midline is the line between the two upper front teeth and the two lower front teeth. Ideally the dental midline for the upper teeth and the dental midline for the lower teeth should match. Additionally, the dental midline should line up with the facial midline of the patient. Clinical signs may indicate deviations between planned midlines for a stage in treatment and actual midlines for the stage in treatment.

Some clinical signs relate to occlusion. Occlusion refers to the contact between teeth. More particularly, occlusion is the relationship between the maxillary (upper) teeth and the mandibular (lower) teeth, such as during chewing. A malocclusion is the misalignment of the teeth and/or jaw that impairs a person's bite. Contacts between maxillary teeth and mandibular teeth may be divided into functional contacts and interfering contacts. Treatment plan 186 may include a planned occlusion for a particular stage in treatment, and clinical signs may indicate a deviation from the planned occlusion (e.g., deviations between planned contacts and actual contacts between upper and lower teeth).

In some instances clinical signs may be related to root positions. Root positions may be determined if the received image data 162 includes x-ray data (e.g., standard x-ray images, CBCT scan data, a panoramic x-ray image, etc.). The x-ray data may be registered with other image data 162, such as a virtual 2D or 3D model of a patient's dental arch generated from an intraoral scan. This data may then be compared with the treatment plan 186. Alternatively, the x-ray data may be compared to the treatment plan 186 without first being registered with other image data 162.

Clinical sign identifier 168 may use different detection rules for identifying each of the different clinical signs. For example, a first detection rule may specify a first clinical sign if an actual tooth position deviates from a planned tooth position by more than a threshold. Alternatively, a single detection rule or set of rules (e.g., that may include algorithms, models and/or profiles) may be used to detect multiple different clinical signs. In one embodiment, clinical sign identifier 168 uses one or more clinical sign profiles 192 to identify clinical signs. One or more of the clinical sign profiles 192 may have been generated using machine learning techniques such as neural networks. For example, a clinical sign profile 192 may be trained based on reference data to correlate changes in dentition features in previous treatment plans that were performed in the reference data with associated clinical signs.

Clinical signs that are identified may be based at least partially on severity. For example, clinical signs may include a determined deviation between a planned value (e.g., a planned tooth position, a planned amount of tooth movement, a planned amount of tooth rotation, a planned amount of palatal expansion, a planned amount of overbite reduction, etc.) and an actual determined value. For example, a clinical sign may be determined that indicates an actual deviation between a planned tooth position and an actual tooth position. Alternatively, or additionally, one or more clinical signs may be determined based on thresholds. If an achieved value deviates from a planned value by more than a threshold, then a clinical sign may be identified.

Once clinical signs are identified, root cause determiner 172 determines one or more root causes from the one or more clinical signs. For some root causes there may be a one to one correspondence between a single clinical sign and a single root cause. For other root causes, a single clinical sign may be associated with multiple different probable root causes. For still other root causes, a combination of multiple clinical signs may be associated with a single root cause. Alternatively, a combination of multiple clinical signs may be associated with multiple different root causes. Accordingly, for each set of observed clinical signs, a list of possible or probable root causes may be determined. In one embodiment, a probability of a determined potential or probable root cause being an actual root cause is computed for each root cause. Display module 118 may then display the list of probable root causes along with the associated probabilities.

Root cause determiner 172 may use different detection rules for determining each of the different root causes from the determined clinical signs. For example, a first detection rule may specify a first root cause if a first combination of clinical signs has been identified and a second detection rule may specify a second root cause if a second clinical sign has been identified. Alternatively, a single detection rule or set of rules (e.g., that may include algorithms, models and/or profiles) may be used to detect multiple different root causes. In one embodiment, clinical sign identifier 168 uses one or more clinical sign profiles 192 to identify clinical signs. One or more of the root cause profiles 194 may have been generated using machine learning techniques such as neural networks. For example, a root cause profile 194 may be trained based on reference data to correlate clinical signs in previous treatment plans with root causes that were determined in those treatment plans.

In one embodiment, the root causes are determined from the identified clinical signs using one or more root cause profiles 194. A root cause profile 194 may be trained by extracting contents from a training data set and performing machine-learning analysis on the contents to generate a classification model and a feature set for the particular clinical sign. Each root cause profile 194 may be or include a tailored algorithm for identifying a particular root cause or multiple different root causes. The training data set includes positive examples of clinical signs that were caused by a particular root cause and negative examples of clinical signs that did not lead to the root cause. To generate the classification model and feature set for a root cause profile, the positive examples of the root cause and the negative examples of the root cause in the training data set are analyzed to determine the frequency of occurrence of clinical signs in the positive examples and in the negative examples. Positive occurrences of clinical signs and negative occurrences of clinical signs may then be ranked based on, for example, frequency of occurrence in the positive examples and negative examples. These features make up a feature set for the root cause profile 194. The classification model for the root cause profile 194 is generated based on the feature set and the training data set. The classification model is a statistical model for data classification that includes a map of support vectors that represent boundary features. The boundary features may be selected from the feature set, and may represent the highest ranked features in the feature set.

Root cause determiner 172 may apply the set of identified clinical signs to an appropriate root cause profile 194. Based on the application of the clinical signs to the root cause profile 194, the root cause determiner 172 may classify the clinical signs as being caused by a particular root cause. In addition, the root cause determiner 172 determines a confidence level for the determined classification, which represents a probability that the determined probable root cause is an actual root cause for the clinical signs. If the confidence value for the root cause is 100%, then it is more likely that the decision that the root cause is accurate than if the confidence value is 50%, for example.

A table of example root causes is provided below. The root causes are divided into different categories of root causes in the table. Note that some of the root causes listed below may be related to events that occurred after the treatment plan 186 was generated. Accordingly, these root causes may not be systematically addressed upfront in the initial version of the treatment plan 186. Other root causes are related to biological conditions of a particular patient that may not have been known when the treatment plan 186 was generated. An attempt to prevent such root causes in the initial treatment plan 186 may not be practical, as it might negatively influence patients who do not have such biological conditions.

Once probable root causes are determined, corrective action determiner 178 determines one or more possible corrective actions based on the one or more root causes and/or on the one or more clinical signs. Display module 118 may then display a list of suggested corrective actions along with the list of probable root causes. For some corrective actions there may be a one to one correspondence between a single root cause and a single corrective action. For other corrective actions, a single corrective action may be associated with multiple different root causes. For still other corrective actions, a combination of multiple corrective actions may be associated with a single root cause. Alternatively, a combination of multiple corrective actions may be associated with multiple different root causes. Accordingly, for each set of determined root causes, a list of corrective actions may be determined.

Corrective action determiner 178 may use different detection rules for determining each of the different corrective actions from the determined root causes (or from a combination of the root causes and the clinical signs). For example, a first detection rule may specify a first corrective action if a first root cause has been identified and a second detection rule may specify a second root cause if a second root cause has been identified. Alternatively, a single detection rule or set of rules (e.g., that may include algorithms, models and/or profiles) may be used to determine multiple different corrective actions. Corrective actions may be determined based on applying one or more detection rules. The detection rules may also reach a conclusion that no correc-

TABLE 3

| Category | Root causes Root Cause |
|---|---|
| Interproximal reduction | Amount of IPR performed is less than planned |
| Interproximal reduction | Amount of IPR performed is more than planned |
| Interproximal reduction | IPR was not performed |
| Patient compliance | Patient is not wearing aligners in accordance with treatment plan |
| Patient compliance | Patient not using elastics with aligner in accordance with treatment plan |
| Attachment | Attachment bonded in wrong position on tooth |
| Attachment | Attachment not placed on designated tooth |
| Attachment | Attachment shape does not correspond to designated attachment shape |
| Attachment | Attachment was not planned, but is required to achieve planned movement |
| Plan | Patient has slow moving teeth for biological reasons |
| Plan | Not enough stages |
| Aligner | Tooth geometry used for aligner doesn't match actual tooth geometry |
| Aligner | Aligner impinges soft tissue (e.g., gingival tissue or cheek) |
| Biology | Due to lag in tooth movement for one or a few teeth, other tooth movement was blocked as well |
| Biology | Biology of tooth (e.g., large roots) slows or prevents planned movement |
| Biology | Teeth planned in opposite buccal-lingual directions without enough space |
| Miscellaneous | Tooth extraction was planned but not performed |

When looking at which teeth are moving as planned and which teeth are lagging or not moving, and determining associated root causes, it can be helpful to divide the tooth movements into different types of possible movement. For example, if a treatment plan calls for a rotation and a translational movement, it may be determined that the rotation was not achieved but that the translational movement was achieved. In another example, if movement is planned in two directions, it may be observed that movement was achieved in a first direction but not in a second direction. By breaking down the motion into individual motion components, the root causes can be more accurately determined. For example, root causes may be different if the tooth is not moving at all than if the tooth is undergoing some types of planned motion but not other types of planned motion.

tive action is needed. For example, in some instances a detection rule may produce a conclusion indicating that although the progress is lagging there is no need to take any action (e.g., based on the assumption that the final result will still be achieved). Additionally, a detection rule may reach a conclusion that no corrective action is to be performed if the treatment plan is progressing as planned.

In one embodiment, corrective action determiner 178 uses one or more corrective action profiles 196 to determine corrective actions. One or more of the corrective action profiles 196 may have been generated using machine learning techniques such as neural networks. For example, a corrective action profile 196 may be trained based on reference data to correlate root causes in previous treatment plans with successful corrective actions that were performed in those treatment plans.

In one embodiment, the corrective actions are determined from the identified root causes (and/or clinical signs) using one or more corrective action profiles 196. A corrective action profile 196 may be trained by extracting contents from a training data set and performing machine-learning analysis on the contents to generate a classification model and a feature set for the particular corrective action. Each corrective action profile 196 may be or include a tailored algorithm for identifying a particular corrective action or multiple different corrective actions. The training data set includes positive examples of corrective actions that corrected particular root causes and negative examples of corrective actions that did not correct particular root causes or that were not attempted for particular root causes. To generate the classification model and feature set for a corrective action profile, the positive examples of the corrective actions and the negative examples of the corrective actions in the training data set are analyzed to determine the frequency of occurrence of root causes in the positive examples and in the negative examples. Positive occurrences of root causes and negative occurrences of root causes may then be ranked based on, for example, frequency of occurrence in the positive examples and negative examples. These features make up a feature set for the corrective action profile 196. The classification model for the corrective action profile 196 is generated based on the feature set and the training data set. The classification model is a statistical model for data classification that includes a map of support vectors that represent boundary features. The boundary features may be selected from the feature set, and may represent the highest ranked features in the feature set. In one embodiment, expert opinion is used in the generation of the corrective action profiles. For example, during profile generation corrective actions that are determined for particular root causes may be presented to experts for their assessment. The experts may then approve or disapprove of the classification.

Corrective action determiner 178 may apply the set of identified root causes (and/or clinical signs) to an appropriate corrective action profile 196. Based on the application of the root causes to the corrective action profile 196, the corrective action determiner 178 may determine that a particular corrective action will correct a root cause and associated clinical sign(s) associated with the root cause. A table of example corrective actions is provided below. The corrective actions are divided into those that require some physical operation or action on the part of the dental practitioner (e.g., IPR, placement of an attachment, extraction of a tooth, etc.) and those that can be performed without an action on the part of the dental practitioner (e.g., adjustments to the treatment plan). Some corrective actions will both require some physical action or operation to be performed by the dental practitioner and will adjust the treatment plan. For corrective actions that include some operation to be performed by the dental practitioner, depending on a complexity of the operation an option to verify whether the corrective action was performed correctly may be suggested. For example, corrective action determiner 178 may output a recommendation that the dental practitioner perform an intraoral scan of the patient's oral cavity after performing the corrective action to determine whether the corrective action was successfully performed (e.g., to confirm the accuracy of an attachment placement or that the correct amount of IPR was performed).

TABLE 4

Corrective actions

| Category | Corrective Action |
| --- | --- |
| Treatment plan adjustment | Slow down velocity of tooth movement (reduce amount of tooth movement between stages) |
| Treatment plan adjustment | Adjust final position of teeth (final condition of dental arch) |
| Treatment plan adjustment | Add overcorrection for specific tooth movement |
| Treatment plan adjustment | Apply more conservative staging pattern (e.g., staging with spaces for problematic contacts) |
| Treatment plan adjustment | Add elastics to aligners |
| Treatment plan adjustment | Add bite ramps to aligners |
| Treatment plan adjustment | Add compliance indicator for aligners |
| Physical operation required | Add attachment to tooth |
| Physical operation required | Adjust attachment on tooth |
| Physical operation required | Re-bond attachment to tooth |
| Physical operation required | Perform interproximal reduction |
| Physical operation required | Extract tooth |
| Physical operation required | Polish aligners in problematic area(s) |
| Physical operation required | Perform new intraoral scan |

After clinical signs and/or root causes are determined, treatment outcome determiner 179 determines whether a planned treatment outcome is possible without any corrective actions. Treatment outcome determiner 179 may also determine whether the planned treatment outcome is possible after application of one or more of the determined corrective actions. Some corrective actions modify the treatment plan by adjusting the treatment outcome (e.g., the final position and/or orientation of one or more teeth) and/or by adjusting a staging to reach the treatment outcome. For example, the treatment plan may be adjusted by adding more stages, by changing the planned condition of the dental arch (e.g., tooth positions and/or orientations) for one or more stages, and so on. In one embodiment, corrective action determiner 178 determines corrective actions after treatment outcome determiner 179 determines that an initially planned final position will be difficult to achieve.

Some example root causes, clinical signs and associated corrective action examples are provided. If residual crowding is present and there are teeth moving in opposite buccal-lingual direction without spaces, staging with spaces for problematic contacts should be applied to treatment plan staging. If a compliance issue is detected and teeth are moving less than planned, then a comment may be provided to the dental practitioner explaining the concern. Additionally a suggestion may be provided to add a compliance indicator. If a residual deep bite is present, and there were no precision bite ramps in the treatment plan, then the treatment plan may be adjusted to add bite ramps to aligner for one or more stages of the treatment plan. If an underperformed IPR is detected, a suggestion may be provided to perform additional IPR. If an underachieved distalization without precision cuts is detected, then the treatment plan may be modified by adding precision cuts to the aligners for one or more stages.

In another example a staging pattern may be modified in certain instances based on one or more corrective actions. If problematic contacts which show residual misalignment and for which teeth were moved against each other in the treatment plan are identified, then one or more treatment stages may be modified to add a space between these teeth (e.g., a space of about 0.25 mm).

In one example, the one or more clinical signs comprise an indication that an actual amount of tooth crowding deviates from a planned amount of tooth crowding and an indication that an actual amount of an interproximal reduction (IPR) has a deviation from a planned amount of the IPR. In the example, the one or more probable root causes comprise the deviation of the actual amount of the IPR from the planned amount of IPR. In the example, the one or more corrective actions comprise at least one of performing the planned amount of the IPR or adjusting planned final positions for the one or more teeth.

In another example, the one or more clinical signs include a clinical sign that planned movement has not been achieved (e.g., is lagging or no movement was achieved), and the one or more clinical signs further comprise an indication that a planned attachment for a tooth is not present or is placed incorrectly. In the example, the one or more probable root causes comprise an absence of the planned attachment or an incorrect placement of the planned attachment. In the example, the one or more corrective actions comprise attaching the planned attachment to the tooth or repositioning the planned attachment on the tooth.

FIGS. 2-6 below describe example applications of adaptive orthodontic treatment. The examples are described with reference to flow charts describing processes of performing adaptive orthodontic treatment. The flow charts provide example processes that may be performed by system 100 of FIG. 1A and/or by other computing devices. The methods depicted in FIGS. 2-6 may be performed by a processing logic that may comprise hardware (e.g., circuitry, dedicated logic, programmable logic, microcode, etc.), software (e.g., instructions run on a processing device to perform hardware simulation), or a combination thereof.

Figure 2:
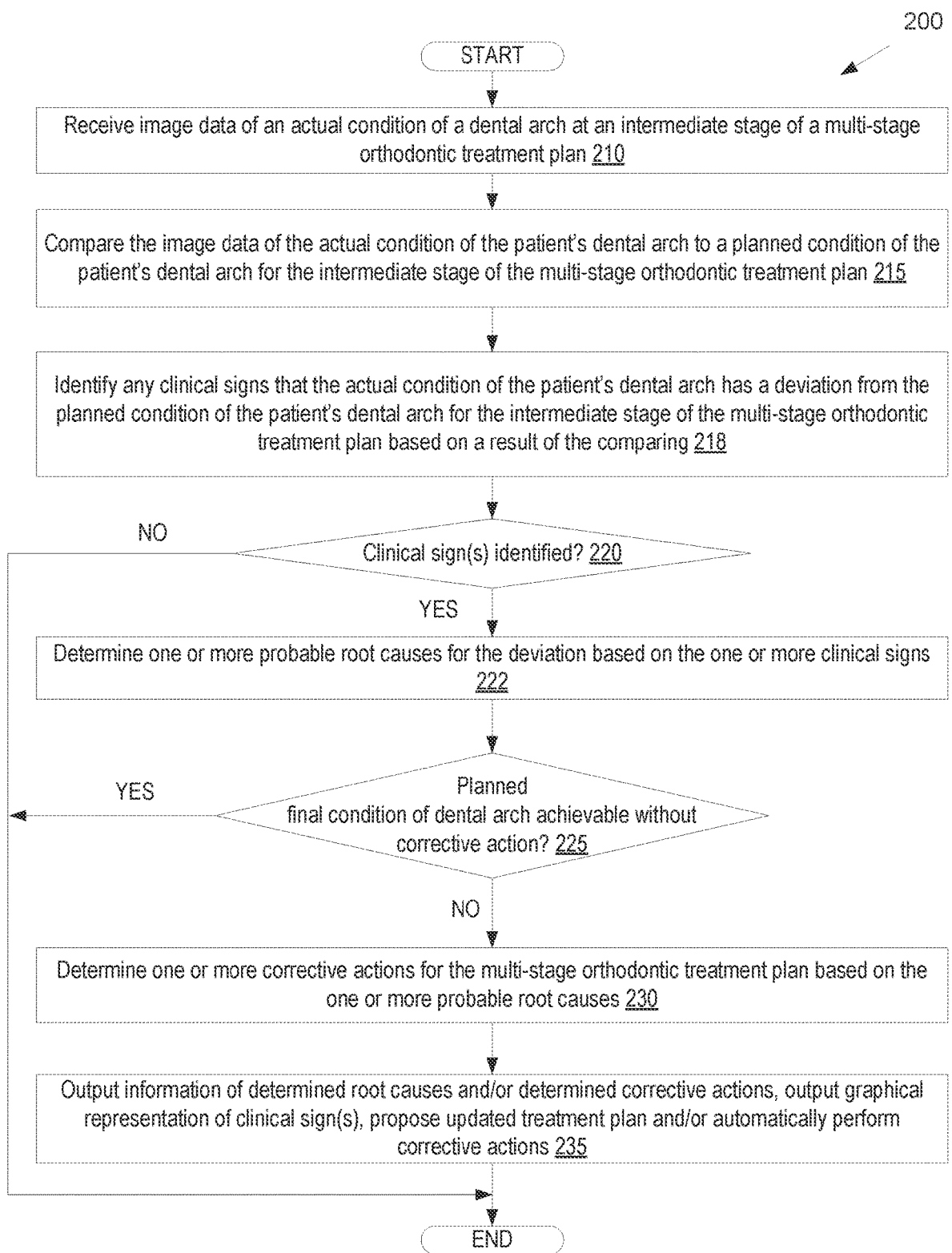
FIG. 2 illustrates a flow diagram for a method of tracking progress of an orthodontic treatment plan, in accordance with an embodiment.

FIG. 2 illustrates a flow diagram for a method 200 of tracking progress of an orthodontic treatment plan, in accordance with an embodiment. At block 210 of method 200, processing logic receives image data of an actual condition of a dental arch at an intermediate stage of a multistage orthodontic treatment plan. The image data may include one or more intraoral images from an intraoral scan of a patient's oral cavity and/or a virtual model generated based on such intraoral images. Additionally, or alternatively, data may include x-ray images such as a panoramic x-ray image, standard x-ray images, CBCT scan data, and so on.

At block 215, processing logic compares the image data of the actual condition of the patient's dental arch to a planned condition of the patient's dental arch for the intermediate stage of the multistage orthodontic treatment plan. At block 218, processing logic identifies any clinical signs that the actual condition of the patient's dental arch has a deviation from the planned condition of the patient's dental arch for the intermediate stage of the multistage orthodontic treatment plan based on a result of the comparing. At block 220, processing logic determines whether any clinical signs have been identified. If no clinical signs are identified, then the method ends. If one or more clinical signs have been identified, the method proceeds to block 222.

At block 222, processing logic determines one or more probable root causes for the deviation based on the one or more clinical signs. In other words, processing logic determines one or more root causes associated with the one or more clinical signs. At block 225, processing logic determines whether a planned final condition of the dental arch is achievable without corrective action. If the planned final condition of the dental arch is achievable without corrective action, then the method may end. However, if the planned final condition of the dental arch is not achievable without corrective action, then the method proceeds to block 230.

At block 230, processing logic determines one or more corrective actions for the multistage orthodontic treatment plan based on the one or more probable root causes. If multiple treatment plans were generated before treatment was begun, then the one or more corrective actions may include a corrective action to switch from implementation of the multistage orthodontic treatment plan to a different multistage orthodontic treatment plan that has already been generated. For example, a first corrective action may be to switch to a second treatment plan, and a second corrective action may be to switch to a third treatment plan. At block 235, processing logic outputs information of the determined root causes and determined corrective actions, and may additionally output information on the clinical signs that have been identified. Alternatively, or additionally, processing logic may output a graphical representation of the clinical signs, propose an updated treatment plan (e.g., propose one or more corrective actions that will modify the treatment plan and/or propose a new final condition for the dental arch), and/or automatically perform one or more of the determined corrective actions. Any updates to the final condition of the dental arch that may be easier to achieve should still address chief concerns of the patient.

Figure 3:
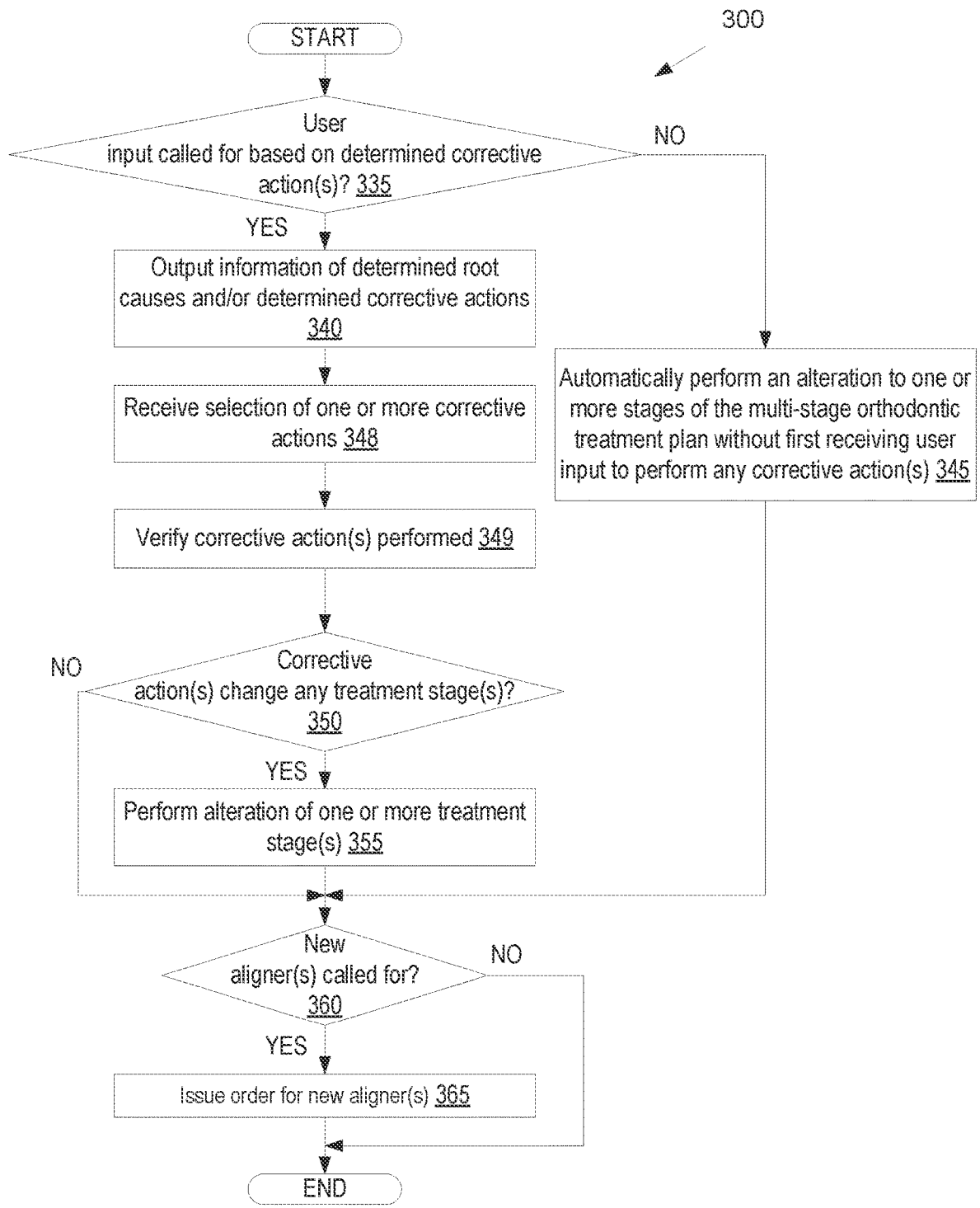
FIG. 3 illustrates a flow diagram for a method of adapting an orthodontic treatment plan, in accordance with an embodiment.

FIG. 3 illustrates a flow diagram for a method 300 of adapting an orthodontic treatment plan, in accordance with an embodiment. Method 300 may be performed after completion of method 200. Method 300 may also be performed at block 235 of method 200.

At block 335 of method 300, processing logic determines whether user input is called for based on one or more determined corrective actions. For example, some corrective actions may require a procedure or operation to be performed by a dental practitioner. Examples of such corrective actions include interproximal reduction, tooth extraction, and attachment placement. Other corrective actions may be performed without any procedure or operation on the part of the dental practitioner. Such corrective actions may be achieved through modification of the treatment plan. In some instances it may be preferable to consult with the dental practitioner before implementing corrective actions. Alternatively, some corrective actions may be automatically performed without input from the dental practitioner. For example, the dental practitioner may select an automatic implementation option. In such an instance, alterations to the treatment plan that affect a final position and/or intermediate staging of the treatment plan may be implemented automatically without input from the dental practitioner. If user input is called for, then the method proceeds to block 340. Otherwise, the method proceeds to block 345.

At block 345, processing logic automatically performs an alteration to one or more stages of the multistage orthodontic treatment plan without first receiving user input to perform any corrective actions. Processing logic may additionally change a final outcome of the orthodontic treatment plan (e.g., a final condition of the dental arch). Accordingly, processing logic may automatically perform one or multiple corrective actions without first receiving input to do so. A notice may be output to a dental practitioner identifying the one or more corrective actions that were automatically performed.

At block 340, processing logic outputs information of determined root causes and/or determined corrective actions. In one embodiment, processing logic outputs a first list identifying the root causes and a second list identifying the corrective actions. At block 348, processing logic receives selection of one or more corrective actions to be performed. Some corrective actions that might be selected by the dental practitioner require a procedure or operation to be performed by the dental practitioner. For such corrective actions, processing logic may request verification that the corrective actions were performed successfully. This may include prompting the dental practitioner to perform an additional intraoral scan and receiving the intraoral scan data from the additional intraoral scan.

At block 350, processing logic determines whether the corrective action (or multiple corrective actions) selected by the dental practitioner cause any changes to one or more treatment stages and/or to a final treatment outcome. If one or more treatment stages and/or the final treatment outcome are to be modified, then the method may proceed to block 355. At block 355, processing logic performs alteration of one or more treatment stages and/or the final treatment outcome. If at block 350 no treatment stages are to be modified, the method may proceed to block 360.

At block 360, processing logic determines whether new aligners are called for. For example, if a planned tooth arrangement for a particular stage has been changed and or the planned tooth arrangement for the final treatment outcome has been changed, then one or more new aligner may be called for. If a new aligners called for, the method proceeds to block 365. Otherwise the method ends.

At block 365, processing logic may issue an order for one or more new aligners. This may include sending digital data such as a computer aided drafting (CAD) file that includes a virtual 3-D model of a planned condition of the patient's dental arch for a particular treatment stage to a manufacturing facility that manufactures aligners. The manufacturing facility may then manufacture the aligner from the virtual 3-D model. This may include using a rapid prototyping machine to manufacture a physical model of the dental arch from the virtual 3-D model, and then thermoforming the aligner around the physical model. Additionally, the dental practitioner may generate a next aligner to be worn by the patient at his or her dental office.

Figure 4:
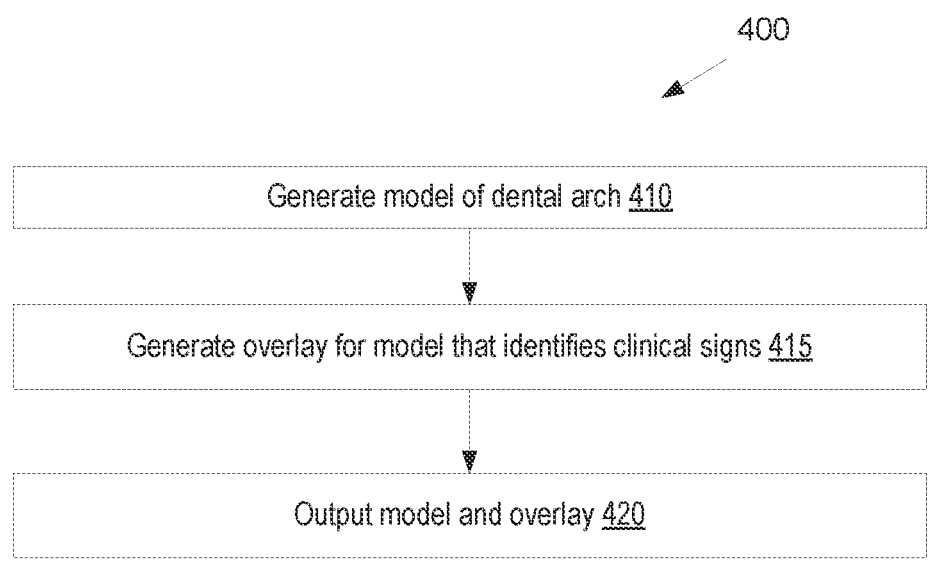
FIG. 4 illustrates a flow diagram for a method of showing compliance with an orthodontic treatment plan and deviation from the orthodontic treatment plan, in accordance with an embodiment.

FIG. 4 illustrates a flow diagram for a method 400 of showing compliance with an orthodontic treatment plan and deviation from the orthodontic treatment plan, in accordance with an embodiment. Method 400 may be performed at the end of method 200. Method 400 may also be performed in conjunction with method 300. At block 410 of method 400, processing logic generates a model of the dental arch. The model of the dental arch may be a generic model or may be a model tailored to a patient's specific dental arch (e.g., generated from an intraoral scan of the patient's dental arch).

At block 415, processing logic generates an overlay for the model that identifies clinical signs that have been identified. The overlay may be a graphical overlay such as a color overlay that color codes teeth on the dental arch according to clinical signs associated with those teeth. At block 420, processing logic outputs the model and the overlay. Accordingly, the dental practitioner may easily determine what clinical signs have a been identified and where, and may at a glance determine how the orthodontic treatment plan is progressing.

Figure 5:
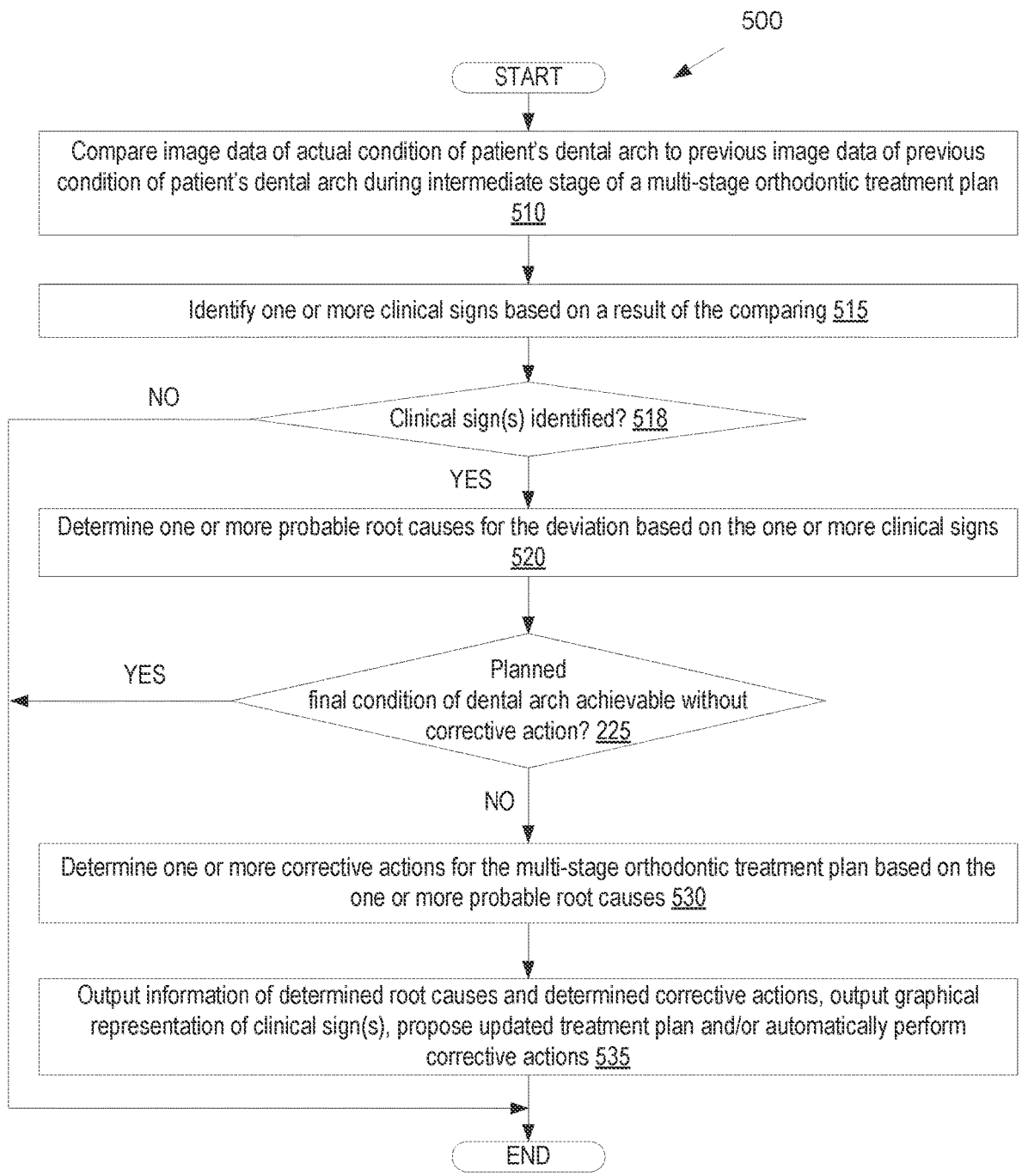
FIG. 5 illustrates a flow diagram for a method of tracking progress of an orthodontic treatment plan based on comparison between current image data and previous image data of a dental arch, in accordance with an embodiment.

FIG. 5 illustrates a flow diagram for a method 500 of tracking progress of an orthodontic treatment plan based on comparison between current image data and previous image data of a dental arch, in accordance with an embodiment. Method 500 may be performed in conjunction with, or in substitution for, method 200. For example, processing logic may compare image data both to prior image data and to a treatment plan in some embodiments. At block 510 of method 500, processing logic compares image data of an actual condition of a patient's dental arch to previous image data of a previous condition of the patient's dental arch during an intermediate stage of a multistage orthodontic treatment plan. Additionally, processing logic may compare the differences between the current condition of the dental arch and the previous condition of the dental arch with a treatment plan. The treatment plan may identify planned differences.

At block 515, processing logic identifies one or more clinical signs based on a result of the comparing. At block 518, processing logic identifies any clinical signs that the change from the previous condition of the patient's dental arch to the current condition of the patient's dental arch has deviated from the treatment plan for a current treatment stage of the multistage orthodontic treatment plan. At block 518, processing logic determines whether any clinical signs have been identified. If no clinical signs are identified, then the method ends. If one or more clinical signs have been identified, the method proceeds to block 520.

At block 520, processing logic determines one or more probable root causes based on the one or more clinical signs. At block 525, processing logic determines whether a planned final condition of the dental arch is achievable without corrective action. If the planned final condition of the dental arch is achievable without corrective action, then the method may end. However, if the planned final condition of the dental arch is not achievable without corrective action, then the method proceeds to block 530.

At block 530, processing logic determines one or more corrective actions for the multistage orthodontic treatment plan based on the one or more probable root causes. At block 535, processing logic outputs information of the determined root causes and determined corrective actions. Alternatively, or additionally, processing logic may output a graphical representation of the clinical signs, propose an updated treatment plan (e.g., propose one or more corrective actions that will modify the treatment plan and or propose a new final condition for the dental arch), and/or automatically perform one or more of the determined corrective actions. Any updates to the final condition of the dental arch that may be easier to achieve should still address chief concerns of the patient.

Figure 6:
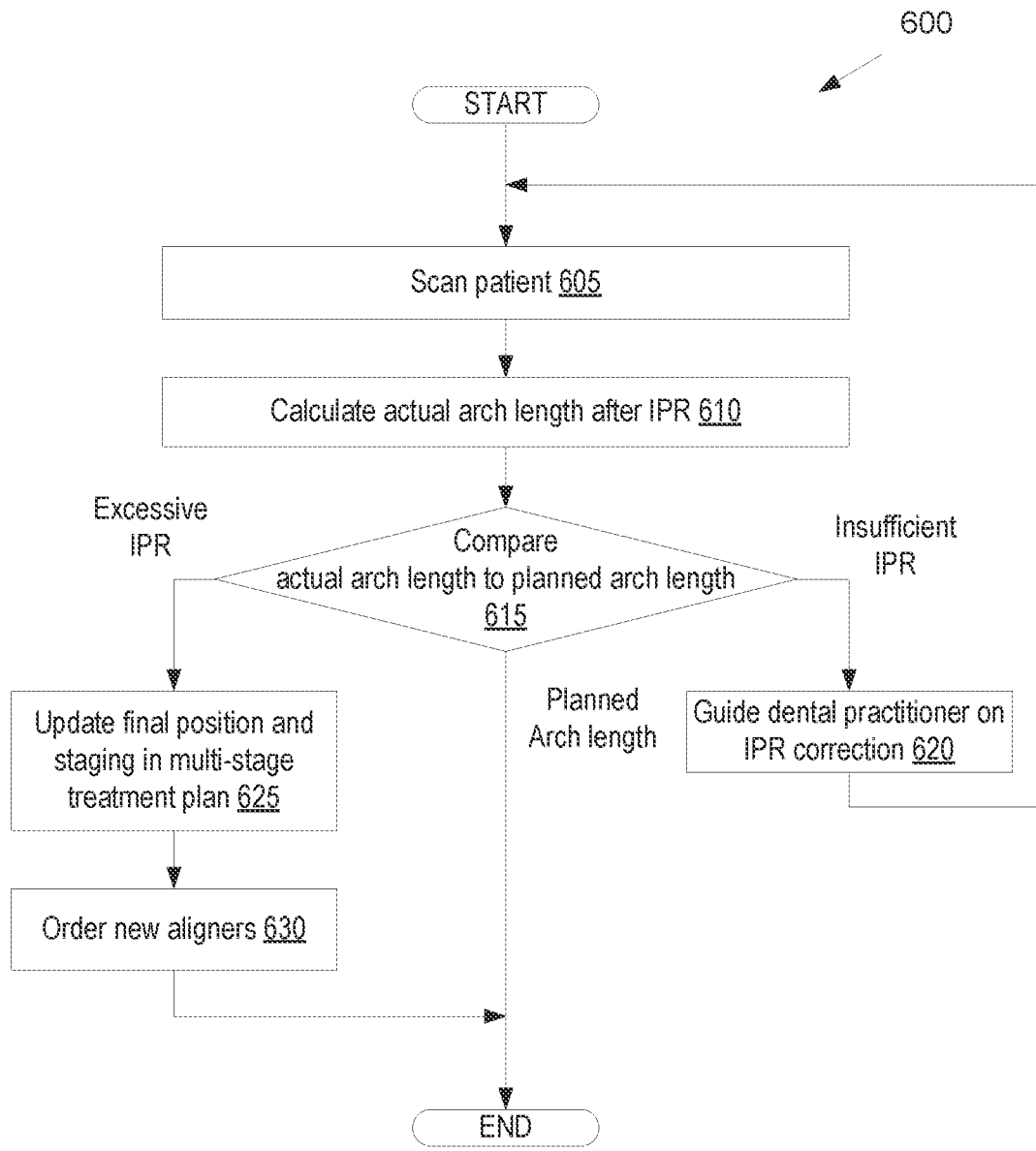
FIG. 6 illustrates a flow diagram for a method of monitoring IPR for an orthodontic treatment plan, in accordance with an embodiment.

FIG. 6 illustrates a flow diagram for a method 600 of monitoring IPR for an orthodontic treatment plan, in accordance with an embodiment. At block 605 of method 600, a dental practitioner scans a patient (e.g., performs an intraoral scan of the patient's oral cavity). Processing logic may receive a result of the scan.

At block 610, processing logic calculates an arch length for the patient's dental arch. The arch length may be calculated after inter-proximal reduction operation was performed. At block 615, processing logic compares an actual arch length to a planned arch length. If the actual arch length matches the planned arch length, then the method ends. If the actual arch length is too great, then a determination is made that insufficient interproximal reduction was performed and the method continues to block 620. At block 620, processing logic guides a dental practitioner on further interproximal reduction (also referred to as interproximal correction). The method then proceeds to block 605, and the patient is again scanned.

If at block 615 it is determined that the arch length is less than planned, then a determination is made that excessive interproximal reduction was performed and the method proceeds to block 625. If too much interproximal reduction was performed, then a planned tooth arrangement may no longer be achievable. Accordingly, at block 625 processing logic updates a final position and a staging in a multistage treatment plan. This may include updating a spacing between one or more teeth and or positions of one or more teeth at various stages and at the treatment outcome. At block 630, processing logic orders one or more new aligners. The method then ends.

Figure 10:
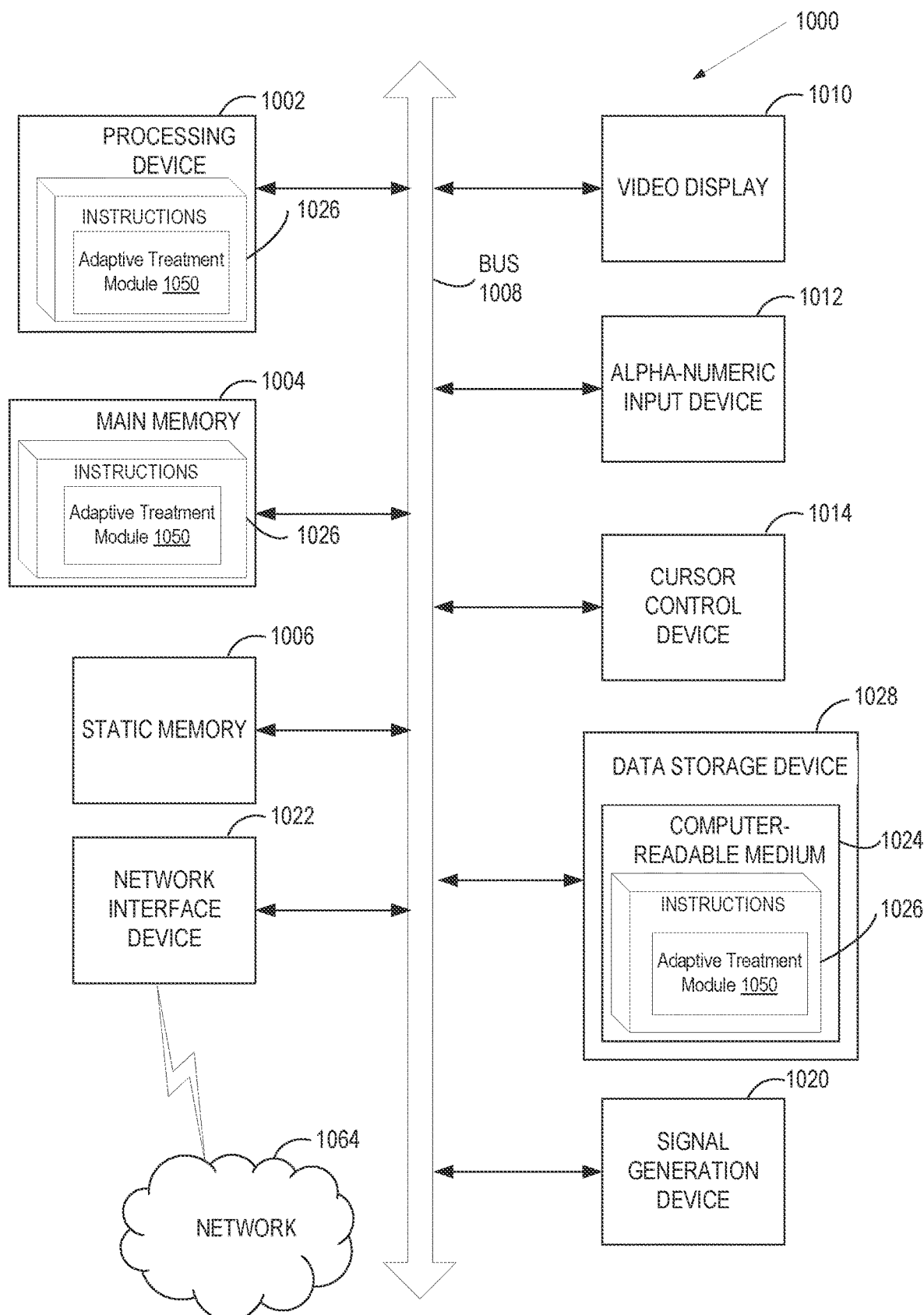
FIG. 10 illustrates a block diagram of an example computing device, in accordance with embodiments of the present invention.

FIG. 10 illustrates a diagrammatic representation of a machine in the example form of a computing device 1000 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein. In one embodiment, the computer device 1000 corresponds to computing devices 105 of FIG. 1A.

The example computing device 1000 includes a processing device 1002, a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1028), which communicate with each other via a bus 1008.

Processing device 1002 represents one or more general-purpose processors such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. Processing device 1002 is configured to execute the processing logic (instructions 1026) for performing operations and steps discussed herein.

The computing device 1000 may further include a network interface device 1022 for communicating with a network 1064. The computing device 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

The data storage device 1028 may include a machine-readable storage medium (or more specifically a non-transitory computer-readable storage medium) 1024 on which is stored one or more sets of instructions 1026 embodying any one or more of the methodologies or functions described herein, such as instructions for an AR processing module 1050. A non-transitory storage medium refers to a storage medium other than a carrier wave. The instructions 1026 may also reside, completely or at least partially, within the main memory 1004 and/or within the processing device 1002 during execution thereof by the computer device 1000, the main memory 1004 and the processing device 1002 also constituting computer-readable storage media.

The computer-readable storage medium 1024 may also be used to store an adaptive treatment module 1050, which may correspond to the similarly named component of FIGS. 1A-1B. The computer readable storage medium 1024 may also store a software library containing methods for an adaptive treatment module 1050. While the computer-readable storage medium 1024 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

It is to be understood that the above description is intended to be illustrative, and not restrictive. Many other embodiments will be apparent upon reading and understanding the above description. Although embodiments of the present invention have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A non-transitory computer readable medium comprising instructions that, when executed by one or more processor, cause the one or more processor to perform operations comprising:
receiving image data of an actual condition of a patient's dental arch at a stage of an orthodontic treatment plan;

comparing, by the one or more processor, the actual condition of the patient's dental arch as depicted in the image data to a planned condition of the patient's dental arch for the stage of the orthodontic treatment plan;

determining an updated orthodontic treatment plan based on one or more differences between the actual condition of the patient's dental arch and the planned condition of the patient's dental arch determined from the comparing; and generating one or more three-dimensional (3D) models for one or more new orthodontic aligners in accordance with the updated orthodontic treatment plan.

2. The non-transitory computer readable medium of claim 1, the operations further comprising:

determining that the one or more new orthodontic aligners are needed to implement the updated orthodontic treatment plan; and issuing an order for the one or more new orthodontic aligners.

3. The non-transitory computer readable medium of claim 1, the operations further comprising:

determining, by the one or more processor, one or more corrective actions for the orthodontic treatment plan based on the one or more differences between the actual condition of the patient's dental arch and the planned condition of the patient's dental arch, wherein the updated orthodontic treatment plan incorporates the one or more corrective actions.

4. The non-transitory computer readable medium of claim 1, the operations further comprising:

determining one or more probable root causes for the one or more differences between the actual condition of the patient's dental arch and the planned condition of the patient's dental arch, wherein the updated orthodontic treatment plan addresses the one or more probable root causes.

5. The non-transitory computer readable medium of claim 1, the operations further comprising:

determining that a planned final condition of the patient's dental arch is not achievable based on a result of the comparing, wherein the updated orthodontic treatment plan at least one of a) enables achievement of the planned final condition of the patient's dental arch orb) modifies the planned final position of the patient's dental arch.

6. The non-transitory computer readable medium of claim 1, the operations further comprising:

detecting one or more clinical signs of the one or more differences between the actual condition of the patient's dental arch and the planned condition of the patient's dental arch, the one or more clinical signs comprising at least on of:

an indication of one or more teeth that have moved as planned;

an indication of one or more teeth that have moved less than planned;

an indication of one or more teeth that have experienced motion that is contrary to a planned motion; or an indication of one or more teeth that have not moved.

7. The non-transitory computer readable medium of claim 1, wherein updating the orthodontic treatment plan comprises modifying a staging of the orthodontic treatment plan.

8. The non-transitory computer readable medium of claim 1, the operations further comprising:

outputting a graphical representation of the one or more differences between the actual condition of the patient's dental arch and the planned condition of the patient's dental arch.

9. The non-transitory computer readable medium of claim 1, the operations further comprising:

guiding a dental practitioner to perform one or more procedures on the patient's dental arch based at least in part on one or more differences between the actual condition of the patient's dental arch and the planned condition of the patient's dental arch.

10. The non-transitory computer readable medium of claim 9, wherein the one or more procedures to be performed on the patient's dental arch comprise an interproximal reduction (IPR) procedure.

11. The non-transitory computer readable medium of claim 1, the operations further comprising:

determining, based on a result of the comparing, that one or more next orthodontic aligners will not fit on the patient's dental arch or will not apply target forces onto one or more teeth on the patient's dental arch; and determining the updated orthodontic treatment plan, wherein the one or more new orthodontic aligners will fit on the patient's dental arch and will apply the target forces onto one or more teeth on the patient's dental arch.

12. The non-transitory computer readable medium of claim 1, wherein the one or more 3D models are associated with one or more future stages of the updated orthodontic treatment plan and are of the patient's dental arch, the operations further comprising; and issuing an order for the one or more new orthodontic aligners, wherein issuing the order comprises sending one or more 3D models to a manufacturing facility that manufactures orthodontic aligners, wherein the manufacturing facility is to manufacture the one or more new orthodontic aligners using the one or more 3D models.

13. The non-transitory computer readable medium of claim 1, wherein the image data comprises at least one of a) one or more intraoral scans of the actual condition of the patient's dental arch orb) a virtual three-dimensional model generated from the one or more intraoral scans.

14. The non-transitory computer readable medium of claim 1, the operations further comprising:

generating a first virtual three-dimensional (3D) model of the actual condition of the patient's dental arch from the image data; and comparing the first virtual 3D model to a second virtual 3D model of the planned condition of the patient's dental arch, wherein the second virtual 3D model is included in the orthodontic treatment plan.

15. The non-transitory computer readable medium of claim 1, wherein the updated orthodontic treatment plan comprises a previously generated alternative orthodontic treatment plan.

16. A system comprising:

an intraoral scanner to generate scan data of an actual condition of a patient's dental arch after an orthodontic treatment plan has begun; and a computing device comprising a memory and a processor, the computing device to:

receive the scan data of the actual condition of the patient's dental arch at a stage of the orthodontic treatment plan;

make a comparison of the actual condition of the patient's dental arch as depicted in the scan data to a planned condition of the patient's dental arch for the stage of the orthodontic treatment plan;

determine an updated orthodontic treatment plan based on one or more differences between the actual condition of the patient's dental arch and the planned condition of the patient's dental arch determined from the comparison; and generate one or more three-dimensional (3D) models for one or more new orthodontic aligners in accordance with the updated orthodontic treatment plan.

17. The system of claim 16, wherein the computing device is further to:

determine that the one or more new orthodontic aligners are needed to implement the updated orthodontic treatment plan; and issue an order for the one or more new orthodontic aligners.

18. The system of claim 16, wherein the computing device is further to:

determine one or more corrective actions for the orthodontic treatment plan based on the one or more differences between the actual condition of the patient's dental arch and the planned condition of the patient's dental arch, wherein the updated orthodontic treatment plan incorporates the one or more corrective actions.

19. The system of claim 16, wherein the computing device is further to:

determine one or more probable root causes for the one or more differences between the actual condition of the patient's dental arch and the planned condition of the patient's dental arch, wherein the updated orthodontic treatment plan addresses the one or more probable root causes.

20. The system of claim 16, wherein the computing device is further to:

determine that a planned final condition of the patient's dental arch is not achievable based on a result of the comparison, wherein the updated orthodontic treatment plan at least one of a) enables achievement of the planned final condition of the patient's dental arch or b) modifies the planned final position of the patient's dental arch.

* * * * *